United States Patent [19]
Ishikawa et al.

[11] Patent Number: 6,008,958
[45] Date of Patent: *Dec. 28, 1999

[54] DRIVING DEVICE FOR OPTICAL MEMBER AND OPTICAL APPARATUS

[75] Inventors: Masanori Ishikawa, Tokyo; Tohru Kawai, Kawasaki, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/964,152

[22] Filed: Nov. 6, 1997

[30] Foreign Application Priority Data

Nov. 11, 1996 [JP] Japan .................................. 8-298644
Dec. 27, 1996 [JP] Japan .................................. 8-350500
Dec. 27, 1996 [JP] Japan .................................. 8-350501

[51] Int. Cl.$^6$ ............................. G02B 7/02; G02B 15/14
[52] U.S. Cl. ............................................. 359/824; 359/626
[58] Field of Search ................................. 359/824, 694, 359/696, 697, 698, 704

[56] References Cited

U.S. PATENT DOCUMENTS 5,052,781 10/1991 Iizuka .................................. 359/823
5,812,325 9/1998 Nomura .................................. 359/700

*Primary Examiner*—Georgia Epps
*Assistant Examiner*—Michael A Lucas
*Attorney, Agent, or Firm*—Robin, Blecker & Daley

[57] ABSTRACT

A driving device for an optical member or an optical apparatus comprises a first transmitting member for transmitting a driving force provided by a driving source, a second transmitting member for transmitting a driving force provided by a manual operation, an output member to which the driving forces from the first and second transmitting members are transmitted, the optical member being moved by a rotation of the output member, and a planetary rotating member in contact with the second transmitting member and the output member, wherein the planetary rotating member is supported for rotation with respect to the first transmitting member, and the first transmitting member rotates while revolving the planetary rotating member.

39 Claims, 14 Drawing Sheets

DRIVING DEVICE FOR OPTICAL MEMBER AND OPTICAL APPARATUS

BACKGROUND OF THE INVENTION

1. Field of the Invention

The present invention relates to a driving device which drives an optical member by means of a driving source and also allows the optical member to be driven by a manual operation, as well as to an optical apparatus having such driving device.

2. Description of Related Art

A lens barrel of the type which includes a built-in vibration type motor has heretofore been used. This type of lens barrel is arranged to perform an automatic focusing operation by means of a ring-shaped vibration type motor built in the lens barrel and also to allow a user to perform a manual focusing operation without the need for a special changeover operation.

A planetary mechanism type of driving device for such lens barrel is proposed in, for example, Japanese Laid-Open Patent Application No. Hei 2-253216 (U.S. Pat. No. 5,335,115). The planetary mechanism type of driving device includes a power transmitting member for transmitting the driving force of a vibration type motor, an operating force transmitting member for transmitting a driving force for manual operation, and planetary rollers maintained in contact with these transmitting members, and rotating support shafts for the respective planetary rollers are provided on an output member which performs lens driving.

FIG. 4 shows one example of the planetary mechanism type of lens driving device for the lens barrel. Referring to FIG. 4, a support tube 101 serves to hold various constituent components of the lens driving device. A ring-shaped vibrator (hereinafter referred to as a stator) 102 constitutes part of a vibration type motor, and an electromechanical energy converting element 103 is joined to one end surface of the stator 102 to excite a vibration in the stator 102. A vibration absorber 104 such as felt is maintained in pressure contact with one surface of the electro-mechanical energy converting element 103, and a disc spring 105 is provided for urging the vibration absorber 104 and the stator 102 in the forward direction along the optical axis of the lens barrel (in FIG. 4, toward the left).

A nut 106 for adjusting the pressure of the disc spring 105 is screwed onto a threaded portion formed to extend around the outer diameter portion of the support tube 101, and a rotation stopper 107 for inhibiting the rotation of the stator 102 is integrally held on the outer diameter portion of the support tube 101. A rotor 108 is arranged to receive a rotating force about the optical axis from the stator 102 while the stator 102 is vibrating, and an automatic-focusing connection plate 110 is arranged to rotate integrally with the rotor 108 via a rubber ring 109.

An output rotating tube 111 has a plurality of shafts 111a which extend in radial directions centered at the optical axis, and rollers 112 are rotatably secured to the shafts 111a, respectively. A focusing key 115 for transmitting the rotation of the output rotating tube 111 to a cam ring for lens driving (not shown) is secured to the output rotating tube 111. A manual-focusing connection plate 113 is arranged to rotate together with a manual operating member (not shown).

Each of the rollers 112 is disposed between the automatic-focusing connection plate 110 and the manual-focusing connection plate 113 and is maintained in contact with both plates 110 and 113. For example, if the driving force of the vibration type motor is transmitted to the automatic-focusing connection plate 110 and the automatic-focusing connection plate 110 is rotated about the optical axis, the rollers 112 revolve about the optical axis together with the output rotating tube 111 while each of the rollers 112 is rotating on its axis, since the rotation of the manual-focusing connection plate 113 is inhibited by the friction between the manual-focusing connection plate 113 and the lens barrel through the manual operating member. The rotation of the output rotating tube 111 is transmitted to the cam ring through the focusing key 115, and a lens (not shown) is driven to move along the optical axis by the cam ring.

On the other hand, if a driving force from the manual operating member is transmitted to the manual-focusing connection plate 113 and the manual-focusing connection plate 113 is rotated about the optical axis, since the rotation of the automatic-focusing connection plate 110 is inhibited by friction between the rotor 108 and the stator 102 of the vibration type motor, the rollers 112 revolve about the optical axis together with the output rotating tube 111 while each of the rollers 112 is rotating on its axis, and the rotation of the output rotating tube 111 is transmitted to the cam ring through the focusing key 115 and the lens is driven to move along the optical axis by the cam ring.

In this manner, it is possible to drive the lens without performing a special changeover operation, merely by actuating the vibration type motor or operating the manual operating member.

In the field of such lens driving device, there is not much demand for higher lens-driving speeds with respect to the operating speed of the manual operating member, because it is necessary for users to readily make fine adjustment of a lens position (focus). In contrast, there is an increasing demand for higher lens-driving speeds for automatic focusing.

In the above-described conventional lens barrel, the driving force of the vibration type motor is transmitted to the output member after having been speed-reduced by the planetary mechanism. If the speed of transmission to the output member is to be increased to make the speed of automatic focusing far higher, the driving speed of the vibration type motor may be made faster. However, as the driving speed of the vibration type motor is made faster, it becomes more difficult to control the stop position of the vibration type motor, and this leads to the problem that the accuracy of control of automatic focusing is easily impaired.

In the lens barrel shown in FIG. 4, the pressure produced by the disc spring 105 to press the stator 102 against the rotor 108 in the vibration type motor is utilized to maintain each of the rollers 112 in pressure contact with both connection plates 110 and 113. Accordingly, care must be taken to optimally set both the pressure between the stator 102 and the rotor 108 and the pressure between each of the rollers 112 and both connection plates 110 and 113.

There is a recently proposed type of lens barrel which makes use of a differential mechanism which uses rollers as a planetary mechanism. The respective rollers of the planetary mechanism have rotating shafts in radial directions perpendicular to the optical axis of the lens barrel. The rollers of the planetary mechanism are disposed in the state of being clamped between an output end surface associated with a manual ring for manual focusing and an output end surface associated with a vibration type motor (ultrasonic motor) for automatic focusing, and an output ring arranged to rotate with the revolution of the rollers about the optical axis is disposed to constitute a differential mechanism whose final output is the rotation of the output ring.

In order to prevent an excessive force from acting on the differential mechanism even if the manual ring is rotated when the rotation of the output ring is inhibited, a friction coefficient is set so that the rollers and the output end surface associated with the manual ring can start slipping at any time when the manual ring is rotated with the rotation of the output ring being inhibited.

Incidentally, if the rollers and the output end surface of the rotor of the vibration type motor are arranged to start slipping at an earlier timing, the rollers rotate about their respective axes without rolling on the output end surface of the rotor and the output end surface of the rotor is abraded at particular points only, so that the marks of the abrasion will be made on the output end surface. On the other hand, if the rollers and the output end surface associated with the manual ring are arranged to start slipping at an earlier timing, the rollers do not roll nor rotate and only the manual ring rotates, so that the entire output end surface associated with the manual ring will be abraded by the rollers. Accordingly, the latter arrangement is more advantageous in abrasion than the former arrangement.

In addition, since the output ring is arranged to drive a focusing lens, the feature of the structure of the ultrasonic motor can be fully utilized, particularly during a manual focusing operation.

As is known, in the vibration type motor, a ring-shaped rotor which constitutes an output member is maintained in pressure contact with a ring-shaped metallic elastic body (which corresponds to a stator) in which to form a progressive wave, by a pressure member such as a spring, so that the rotor is frictionally driven by the progressive wave formed in the elastic body.

In the above-described differential mechanism, even if the output member rotates which receives the pressure of the pressure member along the optical axis, the pressure of the pressure member acts so that the manual ring maintains a non-rotating state, whereas if the manual ring is rotated to perform manual focusing, the non-rotating state of the rotor is maintained because the rotor of the vibration type motor is maintained in pressure contact with the stator. Accordingly, it is possible to effect changeover between an automatic focusing operation and a manual focusing operation without using a special changeover mechanism.

In the conventional lens barrel having the above-described structure, the rollers are used as the planetary mechanism in the differential mechanism which effects changeover between the manual focusing operation and the automatic focusing operation without a special changeover operation, and the output end surface of the vibration type motor and the output end surface of the manual ring are maintained in frictional contact with each other with the rollers being clamped therebetween, thereby realizing transmission of a driving force. Since the pressure of the pressure member for pressing the rotor against the stator of the vibration type motor is used as the pressure required for such frictional contact, such pressure is set to an optimum pressure which can bring out the performance of the vibration type motor.

For this reason, if a focusing lens having a large lens load is driven, a slip occurs in the frictional contact with the rollers and it becomes impossible to efficiently transmit the output of the vibration type motor, so that the focusing lens may not be fully driven.

To cope with this problem, it is preferable that the friction coefficient between the rollers and the output end surface of the manual ring be increased within a range smaller than the friction coefficient between the rollers and the output end surface of the rotor of the vibration type motor, because the first slip occurs between the rollers and the output end surface of the manual ring. However, it is difficult to continuously vary the friction coefficient which greatly depends on the materials of the surfaces in contact with each other.

For this reason, to efficiently transmit the output of the vibration type motor, a pressure member for raising the driving force to a limit driving force capable of transmitting drive without causing a slip between the outer circumferential surface of each of the rollers and the output end surfaces of both the manual ring and the vibration type motor (hereinafter referred to as a slip torque) is provided separately from the pressure member for pressing the rotor against the stator of the vibration type motor, thereby applying to the vibration type motor an optimum pressure capable of bringing out the performance of the vibration type motor.

It has also been proposed to provide an arrangement which makes it possible to apply a pressure capable of producing a sufficient slip torque for the frictional contact between the outer circumferential surface of each of the rollers and the output end surfaces of both the manual ring and the vibration type motor (hereinafter referred to as a pressure separating type).

One conventional example of the pressure separating type will be described below with reference to FIG. 9.

FIG. 9 is a diagrammatic cross-sectional view of a conventional focusing driving unit. A unit support tube 301 serves to hold various constituent components of the focusing driving unit. A ring-shaped vibrator (hereinafter referred to as a stator) 302 has a trapezoidal shape in cross section, and an electrostrictive element 303 for vibrating the stator 302 is joined to one end surface of the stator 302.

A ring-shaped vibration absorber 304 made of felt or the like is maintained in pressure contact with one surface of the electrostrictive element 303, and a first disc spring 305 constitutes first pressure means for urging the vibration absorber 304 along the optical axis of the lens barrel. A first nut 306 for adjusting the pressure of the disc spring 305 is screwed into a threaded portion formed to extend around the inner diameter portion of the unit support tube 301.

A rotation stopper 307 for inhibiting the rotation of the stator 302 is integrally held on the inner diameter portion of the unit support tube 301. A rotor 308 serves as a contact element arranged to receive a rotating force about the optical axis from the stator 302, and a first connection plate 310 is arranged to rotate integrally with the rotor 308 via a rubber ring 309 and is maintained in contact with a first roller 312 which will be described later.

A plurality of roller support shafts 311 each of which rotatably supports the first roller 312 and a second roller 313 (to be described later) are secured to the unit support tube 301 in such a manner as to project toward the optical axis from the inner diameter portion of the unit support tube 301. The first roller 312 is maintained in contact with the first connection plate 310 to receive pressure from first pressure means 305, and has a bearing structure formed by two separate inner and outer diameter sides which are joined to each other by bearing balls to eliminate rotational loss.

The second roller 313 is maintained in contact with a second connection plate 314 (which will be described later) and receives pressure from second pressure means (which will be described later), and has a bearing structure formed by two separate inner and outer diameter sides which are joined to each other by bearing balls to eliminate rotational loss. The second connection plate 314 is maintained in contact with a third roller (which will be described later) and is pressed by the second pressure means and is engaged with a claw of the first connection plate 310 so that the rotation of the first connection plate 310 is transmitted to the second connection plate 314 and the second connection plate 314 is rotated in the same direction as the first connection plate 310.

An output ring 315 has a plurality of output shafts 315*a* which extend in radial directions centered at the optical axis, and third rollers 316 which will be described later are rotatably supported by the output shafts 315*a*, respectively. The revolution of the third rollers 316 about the optical axis is transmitted to the output ring 315, and the rotation of the output ring 315 is transmitted to a cam ring (not shown) connected to the output ring 315. The third rollers 316 are rotatably supported by the output ring 315, and revolve about the optical axis while rolling in the state of being clamped between the second connection plate 314 and a manual-focusing connection plate 317 which will be described later.

The rotation of a focusing ring (not shown) is transmitted to the manual-focusing connection plate 317, and the manual-focusing connection plate 317 receives pressure from the second pressure means (which will be described later) and one end surface of the manual-focusing connection plate 317 is maintained in contact with the third rollers 316.

The material of the manual-focusing connection plate 317 is selected so that the friction coefficient between the third rollers 316 and the manual-focusing connection plate 317 becomes smaller than the friction coefficient between the third rollers 316 and the second connection plate 314. A holding ring 318 is pressed by the second pressure means (which will be described later) and is maintained in contact with the manual-focusing connection plate 317, and is fitted on the body of the focusing driving unit to inhibit the rotation of the body.

A reinforcement plate 319 is secured to the holding ring 318. A second disc spring 320 constitutes the second pressure means, and urges the manual-focusing connection plate 317 against the third rollers 316 along the optical axis. A second nut 321 for adjusting the pressure of the second disc spring 320 is screwed into a threaded portion formed to extend around the inner diameter portion of the unit support tube 301.

However, in the conventional pressure separating type, pressure separating parts for respectively receiving pressure from the vibration type motor and pressure from the manual ring (in the conventional example, the first rollers 312 and the second rollers 313) are disposed in parallel along the optical axis between a vibration type motor portion and a manual connection portion, so that the thrust length of the unit increases.

To obtain another means for solving the above-described problem, attention has been paid to the fact that the slip torque due to the frictional contact between the outer circumferential surface of each of the rollers and the output end surface of the manual ring is smaller than the slip torque due to the frictional contact between the outer circumferential surface of each of the rollers and the output end surface of the vibration type motor and a slip starts to occur at all times between the outer circumferential surface of each of the rollers and the output end surface of the manual ring.

A driving unit, which is incorporated in a lens barrel including a built-in vibration type motor composed of a ring-shaped stator and rotor disposed concentrically with the optical axis of a lens, is provided with a manual-focusing connection member to which the rotation of a manual ring is to be transmitted, and first rollers which are disposed at at least three circumferential locations centered at the optical axis of the lens and which are respectively rotatable on radial axes perpendicular to the optical axis and are capable of rolling in the state of being clamped between the rotor of the vibration type motor and the manual-focusing connection member.

The driving unit also includes an output ring which rotatably supports the first rollers and which rotates about the optical axis by receiving a revolution of the first rollers about the optical axis, a first pressure member which maintains end surfaces of the rotor and the stator of the vibration type motor in pressure contact with each other and also the outer circumferential surfaces of the first rollers and the end surface of the rotor in pressure contact with each other, a second pressure member which maintains the outer circumferential surfaces of the first rollers and an end surface of the manual-focusing connection member in pressure contact with each other, and second rollers which are disposed on the output ring and are urged against an end surface of a fixed portion by the pressure of the second pressure member via the first roller and the output ring.

In the above-described proposed arrangement, the slip torque due to the frictional contact between the outer circumferential surfaces of the rollers and the output end surface of the manual ring can be adjusted to a largest value within a range smaller than the slip torque due to the frictional contact between the outer circumferential surfaces of the rollers and the output end surface of the vibration type motor, whereby the thrust size of the driving unit can be shortened.

One example of the above-described proposed arrangement will be described below with reference to FIG. 10.

FIG. 10 is a diagrammatic cross-sectional view of a focusing driving unit. A unit support tube 401 serves to hold various constituent components of the focusing driving unit. A ring-shaped vibrator (hereinafter referred to as a stator) 402 has a trapezoidal shape in cross section, and an electrostrictive element 403 for vibrating the stator 402 is joined to one end surface of the stator 402. A ring-shaped vibration absorber 404 made of felt or the like is maintained in pressure contact with one surface of the electrostrictive element 403.

A first disc spring 405 constitutes first pressure means for urging the vibration absorber 404 along the optical axis of the lens barrel. A first nut 406 for adjusting the pressure of the disc spring 405 is screwed into a threaded portion formed to extend around the inner diameter portion of the unit support tube 401. The pressure of the first pressure means (the disc spring) 405 is adjusted to an optimum pressure which is capable of bringing out the maximum performance of the vibration type motor.

A rotation stopper 407 for inhibiting the rotation of the stator 402 is integrally held on the inner diameter portion of the body of the focusing driving unit. A rotor 408 is arranged to receive a rotating force about the optical axis of the lens barrel, due to a vibration wave produced in the stator 402.

A connection plate 410 is arranged to rotate integrally with the rotor 408 via a rubber ring 409 and is maintained in contact with first rollers 412 which will be described later.

An output ring 411 has a plurality of shafts 411*a* and 411*b* which extend approximately equally in radial directions centered at the optical axis, and the respective shafts 411*a* rotatably support the first rollers 412 which will be described later, while the respective shafts 411b rotatably support second rollers 413 which will be described later. The rotation of the output ring 411 is transmitted to a cam ring (not shown) which is connected to the output ring 411.

The respective first rollers 412 are rotatably supported by the shafts 411a disposed at a plurality of locations on the output ring 411, and revolve about the optical axis while rolling in the state of being clamped between the connection plate 410 and a manual-focusing connection plate 414. The respective second rollers 413 are rotatably supported by the shafts 411b disposed at a plurality of locations on the output ring 411, and are urged against an end surface of an inner diameter projection 401a of the unit support tube 401 by receiving the pressure applied by second pressure means (which will be described later) from the manual-focusing connection plate 414 (which will be described later) through the first rollers 412 and the output ring 411. The second rollers 413 have a bearing structure formed by two separate inner and outer diameter sides which are joined to each other by bearing balls to eliminate rotational loss.

The second rollers 413 are disposed on the output ring 411 at the same locations as the first rollers 412 in the direction of the optical axis and out of phase with the same in the radial directions so that the second rollers 413 do not interfere with the first rollers 412. The rotation of a focusing ring (not shown) is transmitted to the manual-focusing connection plate 414, and one end surface of the manual-focusing connection plate 414 is maintained in contact with the first rollers 412 by receiving pressure from the second pressure means which will be described later.

The material of the manual-focusing connection plate 414 is selected so that the friction coefficient between the first rollers 412 and the manual-focusing connection plate 414 is smaller than the friction coefficient between the first rollers 412 and the connection plate 410. A holding ring 415 is pressed by the second pressure means (which will be described later) and is maintained in contact with the manual-focusing connection plate 414. The holding ring 415 is fitted on the unit support tube 401 to inhibit the rotation thereof.

A reinforcement plate 416 is secured to the holding ring 415. A second disc spring 417 constitutes the second pressure means, and urges the manual-focusing connection plate 414 against the first rollers 412 along the optical axis.

A second nut 418 for adjusting the pressure of the second disc spring 417 is screwed into a threaded portion formed to extend around the inner diameter portion of the body of the focusing driving unit. The pressure of the second pressure means (the second disc spring) 417 is adjusted to a pressure larger than that of the first pressure means (the first disc spring) 405 so that slip torque due to the frictional contact between the first rollers 412 and an end surface of the manual-focusing connection plate 414 becomes as large as possible within a range smaller than slip torque due to the frictional contact between the first rollers 412 and the connection plate 410.

However, even in the above proposal, the value of output torque is limited because the slip torque on the side of the manual-focusing connection plate 414 is merely increased within the range of the slip toque on the side of the vibration type motor, which slip torque is predetermined on the basis of the pressure of the vibration type motor.

BRIEF SUMMARY OF THE INVENTION

According to one aspect of the present invention, there is provided a driving device for an optical member or an optical apparatus either of which comprises a first transmitting member for transmitting a driving force provided by a driving source, a second transmitting member for transmitting a driving force provided by a manual operation, an output member to which the driving forces from the first and second transmitting members are transmitted, the optical member being moved by a rotation of the output member, and a planetary rotating member in contact with the second transmitting member and the output member, wherein the planetary rotating member is supported for rotation with respect to the first transmitting member, and the first transmitting member rotates while revolving the planetary rotating member.

The above and other objects, features and advantages of the present invention will become apparent from the following detailed description of preferred embodiments of the present invention, taken in conjunction with the accompanying drawings.

DETAILED DESCRIPTION OF THE INVENTION

Preferred embodiments of the present invention will be described below with reference to the accompanying drawings.

(First Embodiment)

Figure 1:
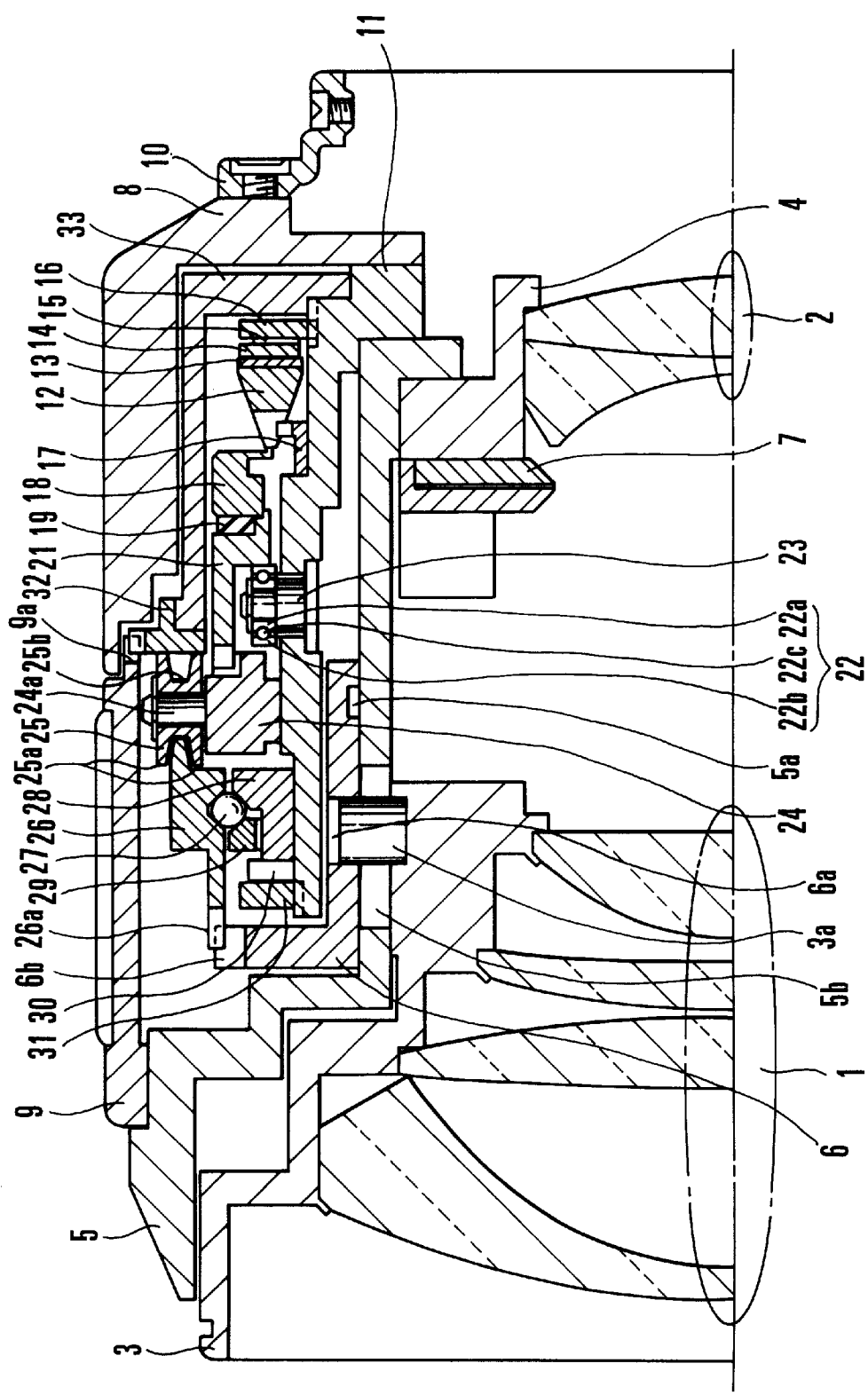
FIG. 1 is a diagrammatic cross-sectional view of a lens barrel according to a first embodiment of the present invention.
Figure 2:
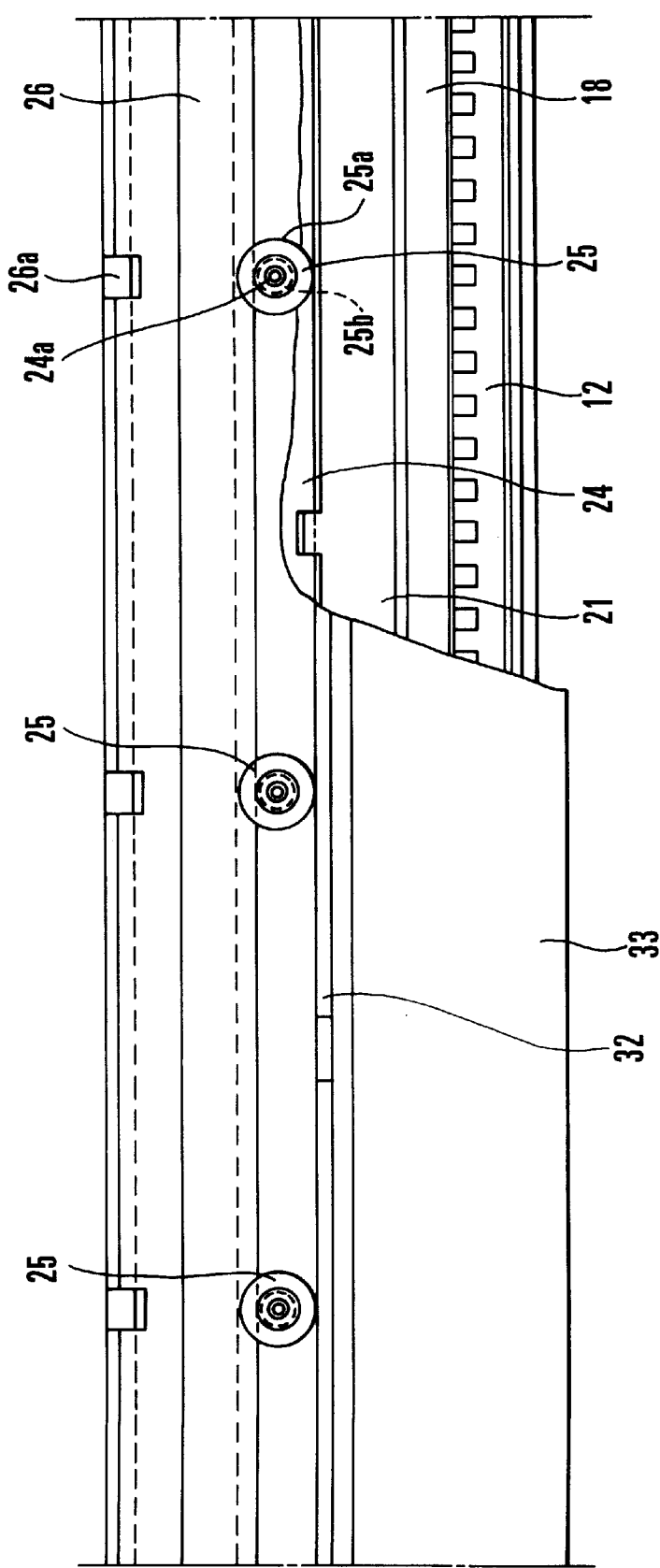
FIG. 2 is a partial developed plan view of the lens barrel according to the first embodiment of the present invention.

FIGS. 1 and 2 show a lens barrel according to a first embodiment of the present invention. The lens barrel shown in FIGS. 1 and 2 includes a focusing lens group 1, a fixed lens group 2, a first lens group tube 3 which holds the focusing lens group 1 and has driving rollers 3a which are engaged with a guide tube 5 and a cam ring 6 both of which will be described later, and a second lens group tube 4 which holds the fixed lens group 2 and is integrally held by the guide tube 5.

The guide tube 5 supports the first lens group tube 3 for sliding movement along the optical axis of the lens barrel, and the cam ring 6 is rotatably fitted on the guide tube 5. Claws 5a for inhibiting the movement of the cam ring 6 along the optical axis are formed on the guide tube 5, and further, rectilinear slots 5b with which the respective driving rollers 3a are engaged are formed in the guide tube 5.

The cam ring 6 has cams 6a with which the respective driving rollers 3a of the first lens group tube 3 are engaged, and also has a projection 6b with which an output rotating tube 26 which will be described later is brought into engagement so that the rotation of the output rotating tube 26 is transmitted to the cam ring 6.

A diaphragm unit 7 is held by the second lens group tube 4, and the guide tube 5 and a support tube 11 which will be described later are held by a fixed tube 8. A focusing operating ring 9 is held for rotation about the optical axis between the guide tube 5 and the fixed tube 8. The focusing operating ring 9 is engaged with a manual-focusing connection ring 32 (to be described later) via a connection claw 9a so that the rotation of the focusing operating ring 9 is transmitted to the manual-focusing connection ring 32. A mount 10 which mechanically engages with a camera body (not shown) is secured to the fixed tube 8.

A unit support tube 11 which holds various constituent members of a driving unit within the lens barrel is held by the fixed tube 8. A ring-shaped vibration member (hereinafter referred to as a stator) 12 having a trapezoidal cross section constitutes a vibration type motor, and an electro-mechanical energy converting element 13 is joined to one end surface of the stator 12 to excite a vibration in the stator 12. A ring-shaped vibration absorber 14 made of felt or the like is maintained in pressure contact with one surface of the electro-mechanical energy converting element 14, and a first disc spring (first pressure means) 15 is provided for urging the vibration absorber 14 along the optical axis. A first nut 16 for adjusting the pressure of the first disc spring 15 is screwed onto a threaded portion formed to extend around the outer diameter portion of the unit support tube 11.

A rotation stopper 17 for inhibiting the rotation of the stator 12 about the optical axis is integrally held by the outer circumferential portion of the unit support tube 11. A rotor 18 is maintained in pressure contact with the stator 12 and receives a rotating force about the optical axis. An automatic-focusing connection ring 21 is arranged to rotate integrally with the rotor 18 via a rubber ring 19.

Support shafts 23 are integrally provided at a plurality of circumferential locations on the unit support tube 11, and bearing rollers 22 are rotatably secured to the respective support shafts 23. An end surface of the automatic-focusing connection ring 21 is maintained in contact with a motor-side portion of the rolling surface of each of the bearing rollers 22, and the automatic-focusing connection ring 21 receives pressure from the first disc spring 15 at that contact portion. Each of the bearing rollers 22 has a construction in which an inner wheel 22a and an outer wheel 22b are joined together by bearing balls 22c to eliminate bearing loss.

A roller support ring (power transmitting member) 24 is integrally rotatably engaged with the automaticfocusing connection ring 21. Support shafts 24a which extend in radial directions centered at the optical axis are provided at a plurality of (for example, three) circumferential locations on the roller support ring 24. Planetary rollers 25 are rotatably secured to the respective support shafts 24a. Each of the planetary rollers 25 has a first outer diameter portion 25a having a larger diameter ($\phi$A1) and a second outer diameter portion 25b having a smaller diameter ($\phi$A2). The first outer diameter portion 25a is divided into two portions located on axially opposite sides of the second outer diameter portion 25b, thereby preventing the planetary roller 25 from tilting due to forces which act on the outer diameter portions 25a and 25b in their radial directions.

The output rotating tube 26 has a contact surface which is engaged with the second outer diameter portion 25b of each of the planetary rollers 25, and a claw 26a which comes into integrally rotatable engagement with the cam ring 6. The output rotating tube 26 is rotatably held via a plurality of bearing balls 27 on a bearing support tube 28 supported on the unit support tube 11. A ball retaining ring 29 is provided for preventing the bearing balls 27 from coming off the bearing support tube 28.

A second disc spring (second pressure means) 30 is provided for urging the bearing support tube 28 in the rearward direction along the optical axis (in FIG. 1, toward the right) to maintain the second outer diameter portion 25b of each of the planetary rollers 25 and the output rotating tube 26 in pressure contact with each other and to maintain the first outer diameter portion 25a of each of the planetary rollers 25 and the manual-focusing connection ring 32 (to be described later) in pressure contact with each other. A second nut 31 for adjusting the pressure of the second disc spring 30 is screwed onto a threaded portion formed to extend around the outer circumferential portion of the unit support tube 11.

The first embodiment is separately provided with the first disc spring 15 for producing the pressure between the stator 12 and the rotor 18 of the vibration type motor and the second disc spring 30 for producing the pressure between the planetary rollers 25 and each of the output rotating tube 26 and the manual-focusing connection ring 32. Accordingly, by adjusting the positions of the first and second nuts 16 and 31, it is possible to easily set the pressures of the respective first and second disc springs 15 and 30 to optimum pressures, i.e., the pressure of the first disc spring 15 can readily be set to a pressure which is capable of bringing out the maximum performance of the vibration type motor, while the pressure of the second disc spring 30 can readily be set to a pressure which does not cause a slip between the planetary rollers 25 and each of the output rotating tube 26 and the manual-focusing connection ring 32.

The manual-focusing connection ring 32 is arranged to receive a rotation from the focusing operating ring 9, and is maintained in contact with the first outer diameter portion 25a of each of the planetary rollers 25. A holding ring 33 for rotatably holding the manual-focusing connection ring 32 is integrally held by the unit support tube 11.

The operation of the lens barrel constructed in the above-described manner will be described below. If a user of the lens barrel operates a focusing switch (not shown) for the purpose of executing automatic focusing, a voltage is applied from a control circuit (not shown) to the electro-mechanical energy converting element 13 so that a vibration which travels along the circumference of the stator 12 is excited in the stator 12. Then, when the stator 12 vibrates, the rotor 18 maintained in pressure contact with the stator 12 by the pressure of the first disc spring 15 is rotationally driven, and the rubber ring 19, the automatic-focusing connection ring 21 and the roller support ring 24 rotate about the optical axis integrally with the rotor 18.

At this time, since the rotations of the focusing operating ring 9 and the manual-focusing connection ring 32 are inhibited by frictions with the guide tube 5 and other associated components, the roller support ring 24 rotates about the optical axis while rolling the planetary rollers 25 along the end surface of the manual-focusing connection ring 32, i.e., the planetary rollers 25 revolve about the optical axis while rotating on the respective support shafts 24a. Accordingly, the rotation of the roller support ring 24 and the rotation of the planetary rollers 25 are combined and transmitted to the output rotating tube 26 so that the output rotating tube 26 is rotated at an increased speed relative to the rotating speed of the roller support ring 24.

If it is assumed here that φA1:φA2 is set to 2:1, the output rotating tube 26 rotates about the optical axis at a rotating speed which is increased to 1.5 times the rotating speed of the roller support ring 24. Specifically, the circumference of the second outer diameter portion 25b with which the output rotating tube 26 is maintained in contact is half of the circumference of the first outer diameter portion 25a with which the manual-focusing connection ring 32 is maintained in contact, so that the amount of rotation transmitted to the output rotating tube 26 by the rotation of the planetary rollers 25 becomes half of the amount of rotation of the roller support ring 24. This half amount of rotation is added to the amount of rotation of the roller support ring 24, and the sum is transmitted to the output rotating tube 26.

When the output rotating tube 26 is rotationally driven, the cam ring 6 engaged with the output rotating tube 26 integrally rotates, and the first lens group tube 3 is driven to move along the optical axis by the action of the cams 6a and the corresponding driving rollers 3a, thereby effecting automatic focusing. Since the rotating speed of each of the output rotating tube 26 and the cam ring 6 is 1.5 times the rotating speed of the vibration type motor as described above, automatic focusing is performed at a high speed.

If the user manually rotates the focusing operating ring 9, the rotation of the focusing operating ring 9 is transmitted to the manual-focusing connection ring 32. At this time, since the vibration type motor is not operating, the rotation of the roller support ring 24 is inhibited by the friction between the stator 12 and the rotor 18. Accordingly, the rotation of the manual-focusing connection ring 32 is transmitted to the output rotating tube 26 by only the rotation of the planetary rollers 25 on their respective axes.

If it is assumed here that φA1:φA2 is set to 2:1, the output rotating tube 26 rotates about the optical axis at a rotating speed which is reduced to 0.5 times the rotating speed of the manual-focusing connection ring 32. Specifically, the circumference of the second outer diameter portion 25b with which the output rotating tube 26 is maintained in contact is half of the circumference of the first outer diameter portion 25a with which the manual-focusing connection ring 32 is maintained in contact, so that the amount of rotation transmitted to the output rotating tube 26 by the rotation of the planetary rollers 25 becomes half of the amount of rotation of the manual-focusing connection ring 32.

When the output rotating tube 26 is rotationally driven, the cam ring 6 engaged with the output rotating tube 26 integrally rotates, and the first lens group tube 3 is driven to move along the optical axis by the action of the cams 6a and the corresponding driving rollers 3a, thereby effecting manual focusing. Since the rotating speed of each of the output rotating tube 26 and the cam ring 6 is 0.5 times the rotating speed of each of the manual-focusing connection ring 32 and the focusing operating ring 9 as described above, manual focusing is performed at a low speed.

(Second Embodiment)

Figure 3:
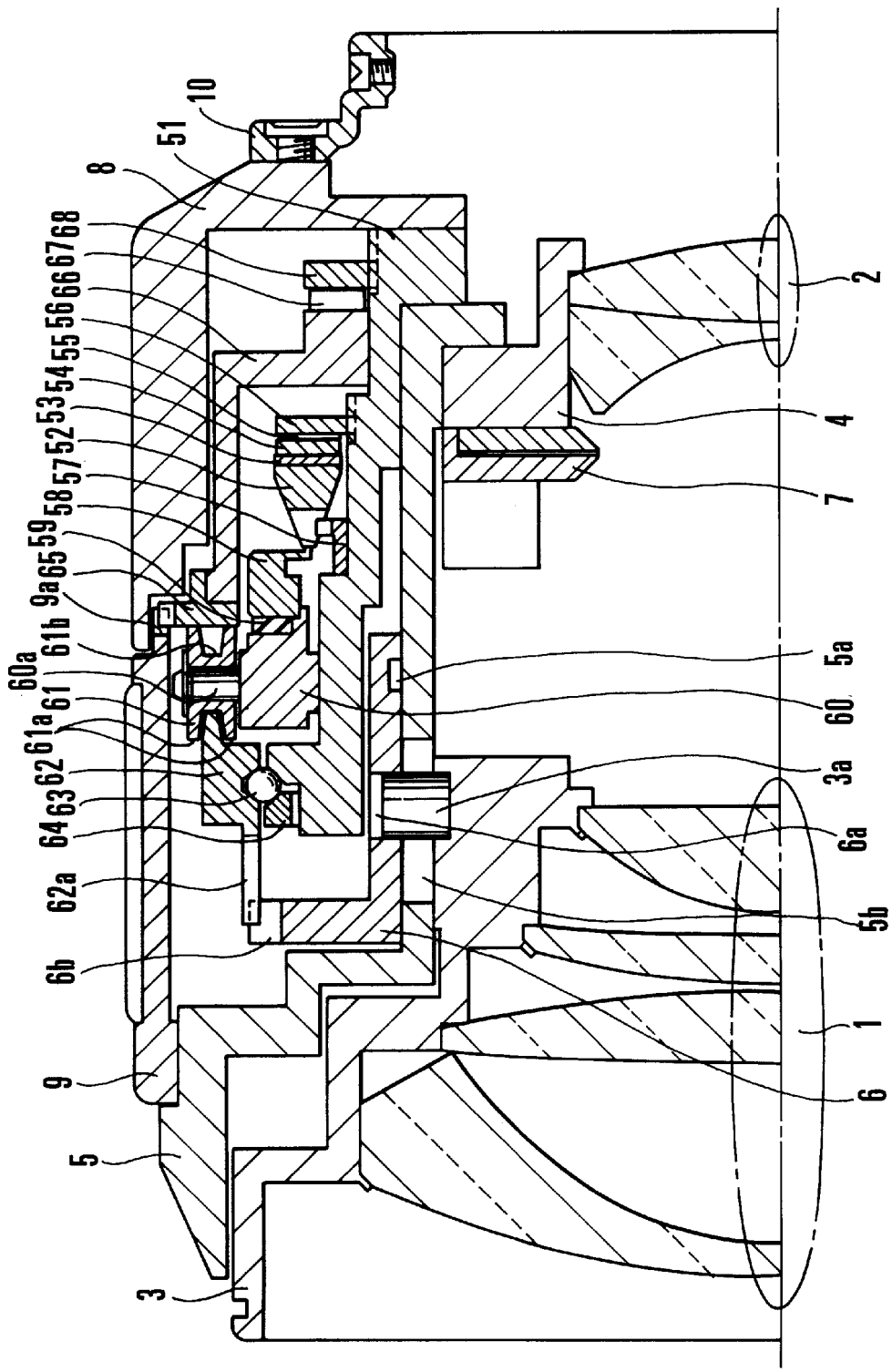
FIG. 3 is a diagrammatic cross-sectional view of a lens barrel according to a second embodiment of the present invention.
Figure 4:
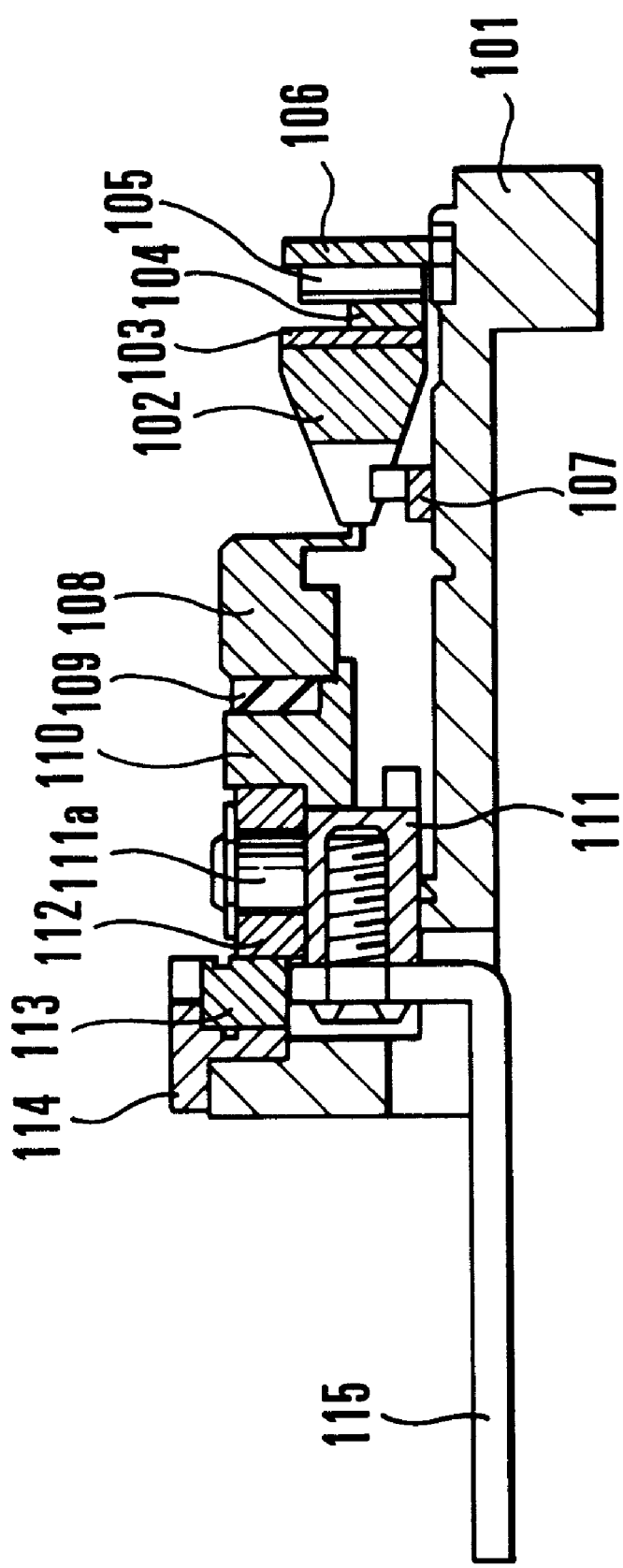
FIG. 4 is a diagrammatic cross-sectional view of a driving part in a conventional lens barrel.

FIG. 3 shows a lens barrel according to a second embodiment of the present invention. In the description of the second embodiment, identical reference numerals are used to denote constituent elements identical to those used in the first embodiment, and the description thereof is omitted.

A unit support tube 51 which holds various constituent members of a driving unit within the lens barrel is held by the fixed tube 8. A ring-shaped stator 52 having a trapezoidal cross section constitutes a vibration type motor, and an electro-mechanical energy converting element 53 is joined to one end surface of the stator 52 to excite a vibration in the stator 52. A ring-shaped vibration absorber 54 made of felt or the like is maintained in pressure contact with one surface of the electro-mechanical energy converting element 53, and a first disc spring (first pressure means) 55 is provided for urging the vibration absorber 54 and the stator 52 along the optical axis of the lens barrel. A first nut 56 for adjusting the pressure of the first disc spring 55 is screwed onto a threaded portion formed to extend around the outer diameter portion of the unit support tube 51.

A rotation stopper 57 for inhibiting the rotation of the stator 52 about the optical axis is integrally held by the outer circumferential portion of the unit support tube 51. A rotor 58 is maintained in pressure contact with the stator 52 and receives a rotating force about the optical axis.

A roller support ring (power transmitting member) 60 is integrally rotatably connected to the rotor 58 via a rubber ring 59. Support shafts 60a which extend in radial directions centered at the optical axis are provided at a plurality of (for example, three) circumferential locations on the roller support ring 60. Planetary rollers 61 are rotatably secured to the respective support shafts 60a. Each of the planetary rollers 61 has a first outer diameter portion 61a having a larger diameter (φA1) and a second outer diameter portion 61b having a smaller diameter (φA2). The first outer diameter portion 61a is divided into two portions located on axially opposite sides of the second outer diameter portion 61b, thereby preventing the planetary roller 61 from tilting due to forces which act on the outer diameter portions 61a and 61b in their radial directions.

The output rotating tube 62 has a contact surface which is engaged with the second outer diameter portion 61b of each of the planetary rollers 61, and a claw 62a which comes into integrally rotatable engagement with the cam ring 6. The output rotating tube 62 is rotatably held via a plurality of bearing balls 63 on a bearing support portion formed on the unit support tube 51. A ball retaining ring 64 is provided for preventing the bearing balls 63 from coming off the bearing support portion.

A manual-focusing connection ring 65 is arranged to receive a rotation from the focusing operating ring 9, and is rotatably held by the a holding ring 66. A second disc spring (second pressure means) 67 is provided for urging the holding ring 66 in the forward direction along the optical axis to maintain the second outer diameter portion 61b of each of the planetary rollers 61 and the output rotating tube 62 in pressure contact with each other and to maintain the first outer diameter portion 61a of each of the planetary rollers 61 and the manual-focusing connection ring 65 in pressure contact with each other. A second nut 68 for adjusting the pressure of the second disc spring 67 is screwed onto a threaded portion formed to extend around the outer circumferential portion of the unit support tube 51.

The second embodiment is separately provided with the first disc spring 55 for producing the pressure between the stator 52 and the rotor 58 of the vibration type motor and the second disc spring 67 for producing the pressure between the planetary rollers 61 and each of the output rotating tube 62 and the manual-focusing connection ring 65. Accordingly, by adjusting the positions of the first and second nuts 56 and 68, it is possible to easily set the pressures of the respective first and second disc springs 55 and 67 to optimum pressures, i.e., the pressure of the first disc spring 55 can readily be set to a pressure which is capable of bringing out the maximum performance of the vibration type motor, while the pressure of the second disc spring 67 can readily be set to a pressure which does not cause a slip between the planetary rollers 61 and each of the output rotating tube 62 and the manual-focusing connection ring 65.

The operation of the lens barrel constructed in the above-described manner will be described below. If a user of the lens barrel operates a focusing switch (not shown) for the purpose of executing automatic focusing, a voltage is applied from a control circuit (not shown) to the electro-mechanical energy converting element 53 so that a vibration which travels along the circumference of the stator 52 is excited in the stator 52. Then, when the stator 52 vibrates, the rotor 58 maintained in pressure contact with the stator 52 by the pressure of the first disc spring 55 is rotationally driven, and the rubber ring 59 and the roller support ring 60 rotate about the optical axis integrally with the rotor 58.

At this time, since the rotations of the focusing operating ring 9 and the manual-focusing connection ring 65 are inhibited by frictions with the guide tube 5 and other associated components, the roller support ring 60 rotates about the optical axis while rolling the planetary rollers 61 along the end surface of the manual-focusing connection ring 65, i.e., the planetary rollers 61 revolve about the optical axis while rotating on the respective support shafts 61a. Accordingly, the rotation of the roller support ring 60 and the rotation of the planetary rollers 61 are combined and transmitted to the output rotating tube 62 so that the output rotating tube 62 is rotated at an increased speed relative to the rotating speed of the roller support ring 60.

If it is assumed here that $\phi A1:\phi A2$ is set to 2:1, the output rotating tube 62 rotates about the optical axis at a rotating speed which is increased to 1.5 times the rotating speed of the roller support ring 60. Specifically, the circumference of the second outer diameter portion 61b with which the output rotating tube 62 is maintained in contact is half of the circumference of the first outer diameter portion 61a with which the manual-focusing connection ring 65 is maintained in contact, so that the amount of rotation transmitted to the output rotating tube 62 by the rotation of the planetary rollers 61 becomes half of the amount of rotation of the roller support ring 60. This half amount of rotation is added to the amount of rotation of the roller support ring 60, and the sum is transmitted to the output rotating tube 62.

When the output rotating tube 62 is rotationally driven, the cam ring 6 engaged with the output rotating tube 62 integrally rotates, and the first lens group tube 3 is driven to move along the optical axis by the action of the cams 6a and the corresponding driving rollers 3a, thereby effecting automatic focusing. Since the rotating speed of each of the output rotating tube 62 and the cam ring 6 is 1.5 times the rotating speed of the vibration type motor as described above, automatic focusing is performed at a high speed.

If the user manually rotates the focusing operating ring 9, the rotation of the focusing operating ring 9 is transmitted to the manual-focusing connection ring 65. At this time, since the vibration type motor is not operating, the rotation of the roller support ring 60 is inhibited by the friction between the stator 52 and the rotor 58. Accordingly, the rotation of the manual-focusing connection ring 65 is transmitted to the output rotating tube 62 by only the rotation of the planetary rollers 61 on their respective axes.

If it is assumed here that $\phi A1:\phi A2$ is set to 2:1, the output rotating tube 62 rotates about the optical axis at a rotating speed which is reduced to 0.5 times the rotating speed of the manual-focusing connection ring 65. Specifically, the circumference of the second outer diameter portion 61b with which the output rotating tube 62 is maintained in contact is half of the circumference of the first outer diameter portion 61a with which the manual-focusing connection ring 65 is maintained in contact, so that the amount of rotation transmitted to the output rotating tube 62 by the rotation of the planetary rollers 61 becomes half of the amount of rotation of the manual-focusing connection ring 65.

When the output rotating tube 62 is rotationally driven, the cam ring 6 engaged with the output rotating tube 62 integrally rotates, and the first lens group tube 3 is driven to move along the optical axis by the action of the cams 6a and the corresponding driving rollers 3a, thereby effecting manual focusing. Since the rotating speed of each of the output rotating tube 62 and the cam ring 6 is 0.5 times the rotating speed of each of the manual-focusing connection ring 65 and the focusing operating ring 9 as described above, manual focusing is performed at a low speed.

Although either of the first and second embodiments has been described with reference to the arrangement in which the outer diameter of the first outer diameter portion 25a or 61a of each of the planetary rollers 25 or 61 is larger than the outer diameter of the second outer diameter portion 25b or 61b of each of the planetary rollers 25 or 61, the ratio of such outer diameters may be arbitrarily selected. For example, if the outer diameters of both the first and second outer diameter portions are made the same, the rotating speed of the output rotating tube 26 or 62 becomes twice the speed of rotation transmitted from the vibration type motor, and equal to the speed of rotation transmitted from the manual-focusing connection ring 32 or 65. If the second outer diameter portion 25b or 61b is made larger than the first outer diameter portion 25a or 61a, it is possible to increase the rotating speed of the output rotating tube 26 or 62 with respect to not only the rotation transmitted from the vibration type motor but also the rotation transmitted from the manual-focusing connection ring 32 or 65.

Although either of the first and second embodiments has been described above with reference to the arrangement in which the manual-focusing connection ring 32 or 65 is directly connected to the focusing operating ring 9, a speed reducing or increasing mechanism may also be interposed between the manual-focusing connection ring 32 or 65 and the focusing operating ring 9.

Although either of the first and second embodiments has been applied to a lens barrel, the present invention can be applied to any optical apparatus other than such lens barrel as well as to any other apparatus that has an arrangement and construction capable of selectively driving an output member by a powered operating force and a manual operating force.

As described above, according to each of the first and second embodiments, not only is it possible to retain the advantage of the conventional driving device which can rotationally drive the output member selectively by the driving force of a driving source and the driving force of a manual operation without the need for a special changeover operation, but also the rotation of an operating force transmitting member can be transmitted to an output member as a rotation of equal or reduced speed through only the rotation of each planetary rotating member on its axis, whereas the rotation of a power transmitting member can be transmitted to the output member as a rotation of increased speed through a combination of the revolution and rotation of the planetary rotating members. Accordingly, if this driving device is used to drive a lens for focusing purpose, it is possible to realize an optical apparatus which allows fine adjustment of focus to be readily performed by a manual operation and which can perform automatic focusing at high speeds.

Incidentally, if each of the planetary rotating members is provided with a first outer diameter portion and a second outer diameter portion which differs in diameter from the first outer diameter portion, it is possible to freely set a speed reducing rate in the transmission of rotation from the operating force transmitting member to the output member and a speed increasing rate in the transmission of rotation from the power transmitting member to the output member.

Particularly in a case where the driving source is a vibration type motor, if pressure means for maintaining the output member and the operating force transmitting member in pressure contact with the planetary rotating members is provided separately from pressure means for maintaining the output member and the operating force transmitting member in pressure contact with the planetary rotating members, it is possible to readily optimally set the pressure between the planetary rotating members and the output member as well as the operating force transmitting means, and the pressure between a vibrator and a contact element.

(Third Embodiment)

Figure 5:
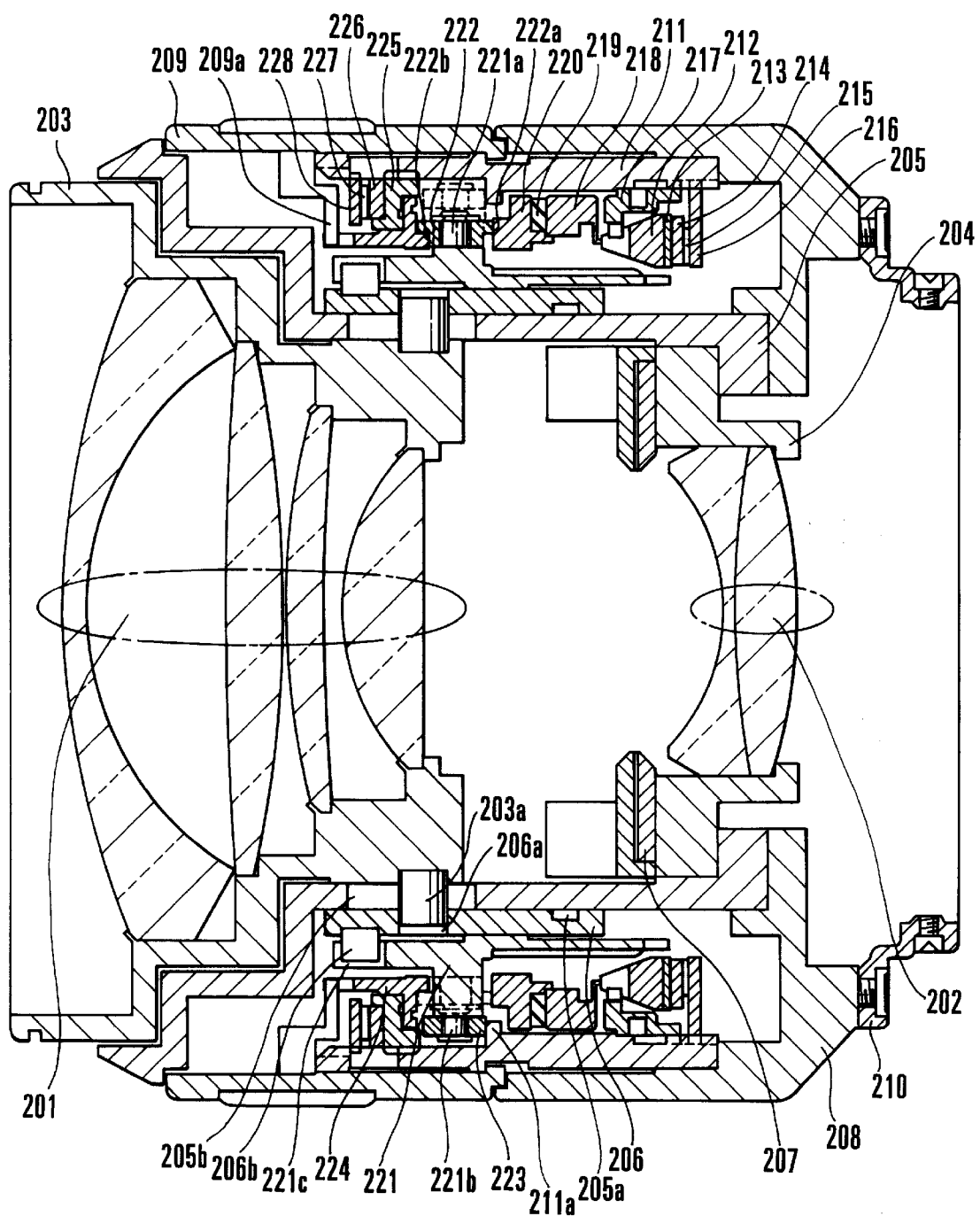
FIG. 5 is a diagrammatic cross-sectional view of a lens barrel according to a third embodiment of the present invention.

FIG. 5 is a cross-sectional view of a lens barrel which constitutes an optical apparatus, using a driving unit according to a third embodiment of the present invention. The shown lens barrel includes a focusing lens group 201 which serves as a moving lens group, a fixed lens group 202, a first lens group tube 203 which holds the focusing lens group 201 and has driving rollers 203*a* engaged with a guide tube 205 and a cam ring 206 both of which will be described later.

A second lens group tube 204 which holds the fixed lens group 202 is integrally held by the guide tube 205 which will be described later. The guide tube 205 supports the first lens group tube 203 for sliding movement along the optical axis of the lens barrel. The guide tube 205 rotatably supports the cam ring 206 (which will be described later), and has claws 205*a* for inhibiting the movement of the cam ring 206 along the optical axis and rectilinear slots 205*b* with which the respective driving rollers 203*a* are engaged.

The cam ring 206 is rotatably engaged with the guide tube 205 by the claws 205*a* and has cams 206*a* with which the respective driving rollers 203*a* of the first lens group tube 203 are engaged, and also has a projection 206*b* which is brought into engagement with an output ring 221 of a focus driving unit (to be described later) so that the rotation of the output ring 221 is transmitted to the cam ring 206. A diaphragm unit 207 is held by a second lens group barrel 204.

A fixed tube 208 holds the guide tube 205 and a unit support tube 211 of the focusing driving unit which will be described later, and a mount 210 which will be described later is integrally secured to the fixed tube 208. A focusing operating ring 209 which serves as a manual-focusing operating member is held for rotation with respect to the unit support tube 211 of the focusing driving unit which will be described later, and transmits the rotation of the focusing operating ring 209 to a manual-focusing connection plate 224 via a connection claw 209*a*.

The mount 210 to be mechanically connected to a camera body (not shown) is secured to the above-described fixed tube 208.

The focusing driving unit includes constituent components 211 to 228. The unit support tube 211 for holding various constituent components of the focusing driving unit is held by the fixed tube 208 provided as a fixed member. The ring-shaped vibrator (hereinafter referred to as a stator) 212 has a trapezoidal shape in cross section.

The electrostrictive element 213 which serves as an electro-mechanical energy converting element for vibrating the stator 212 is jointed to one end surface of the stator 212. The ring-shaped vibration absorber 214 made of felt or the like is maintained in pressure contact with one surface of the electrostrictive element 213. The first disc spring 215 is a pressure spring which serves as first pressure means for urging the stator 212 in the forward direction along the optical axis of the lens barrel via the vibration absorber 214.

The first nut 216 for adjusting the pressure of the disc spring 215 is screwed into a threaded portion formed to extend around the inner diameter portion of the unit support tube 211. The pressure of the disc spring 215 is adjusted to an optimum pressure which is capable of bringing out the maximum performance of the vibration type motor such as an ultrasonic motor which serves as a driving source. The rotation stopper 217 for inhibiting the rotation of the stator 212 is integrally held on the inner diameter portion of the unit support tube 211.

The rotor 218 serves as a contact element 218 in contact with the stator 212, and is arranged to receive a rotating force about the optical axis, due to the vibration wave of the stator 212. The connection member 220 which serves as a rotating member is arranged to rotate integrally with the rotor 218 via the rubber ring 219 and is maintained in contact with the first contact portions 222*a* of the first rollers 222 which will be described later.

Figure 7:
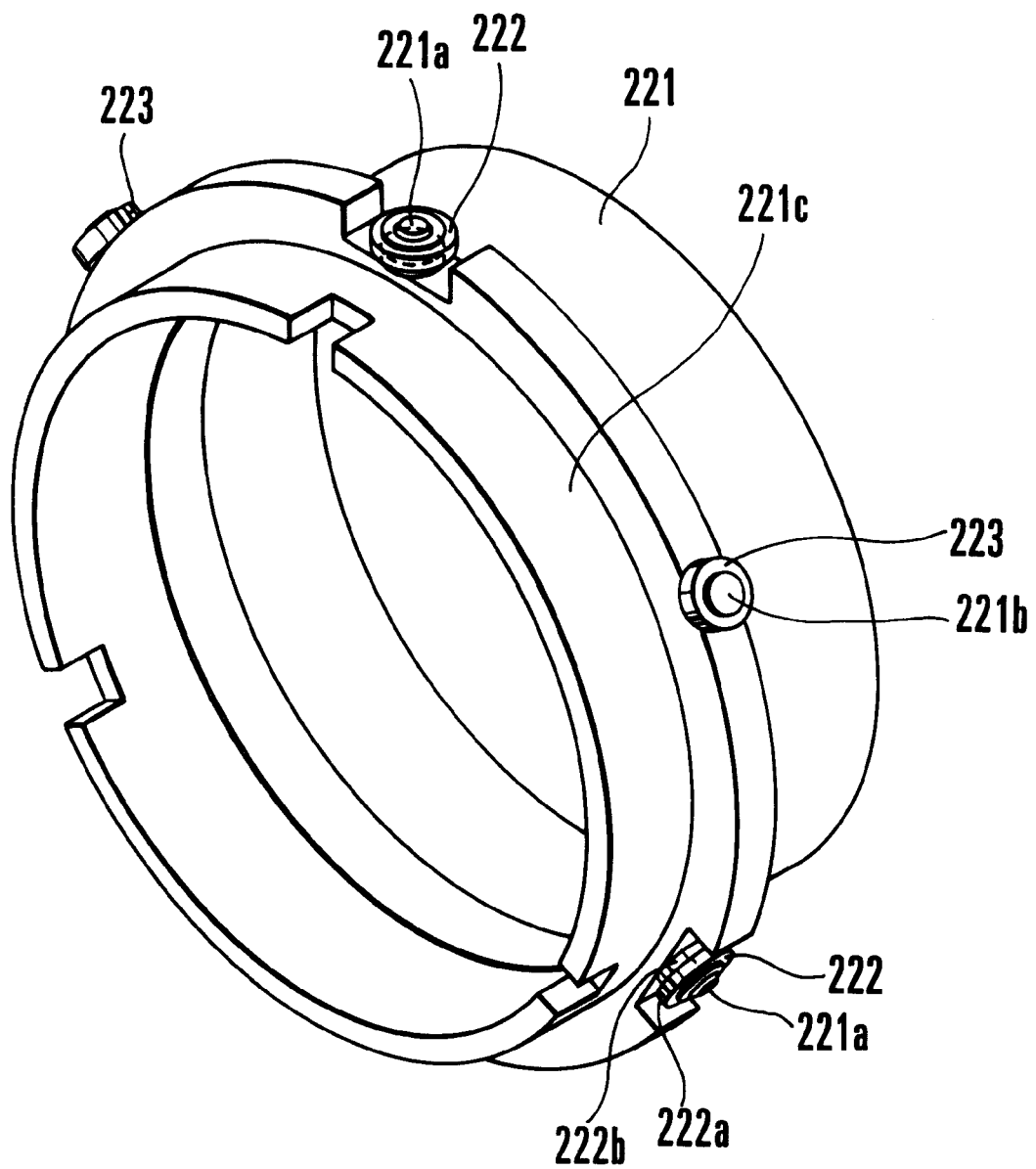
FIG. 7 is a partial perspective view of the lens barrel shown in FIG. 5.

The output ring 221 which serves as an output member has a plurality of shafts 221*a* and 221*b* which extend approximately equally in radial directions centered at the optical axis (refer to the perspective view of FIG. 7), and the respective shafts 221*a* rotatably support the first rollers 222 which will be described later, while the respective shafts 221*b* rotatably support the second rollers 223 which will be described later. The output ring 221 also has the projection 221*c* for transmitting the rotation of the output ring 221 to the cam ring 206.

The respective first rollers 222 are rotatably supported by the shafts 221*a* disposed at a plurality of locations on the output ring 221, and revolve about the optical axis while rolling in the state of being clamped between the connection plate 220 and the manual-focusing connection plate 224 which will be described later. Each of the first rollers 222 has a first contact portion 222*a* which has a larger diameter (outer diameter $\phi A1$) and with which the connection member 220 is maintained in contact and a second contact portion 222*b* which has a smaller diameter (outer diameter $\phi A2$) and with which the manual-focusing connection plate 224 is maintained in contact.

The respective second rollers 223 are rotatably supported by the shafts 221*b* disposed at a plurality of locations on the output ring 221, and are urged against an end surface of the inner diameter projection 211*a* of the unit support tube 211 by receiving the pressure applied by second pressure means (which will be described later) from the manual-focusing connection plate 224 (which will be described later) through the first rollers 222 and the output ring 221. As will be described later, since the pressure of the second pressure means is larger than the pressure of the first pressure means, the second rollers 223 are at all times urged against and received by the inner diameter projection 211a which serves as a receiving portion. The unit support tube 211 serves as a receiving member.

The second rollers 223 are disposed on the output ring 221 at the same locations as the first rollers 222 in the direction of the optical axis and out of phase with the same in the radial directions so that the second rollers 223 do not interfere with the first rollers 222. The rotation of the focusing operating ring 209 is transmitted to the manual-focusing connection plate 224, and one end surface of the manual-focusing connection plate 224 is maintained in contact with the second contact portions 222b of the first rollers 222 by receiving pressure from the second pressure means which will be described later.

The material of the manual-focusing connection plate 224 is selected so that the friction coefficient between the first rollers 222 and the manual-focusing connection plate 224 is smaller than the friction coefficient between the first rollers 222 and the connection member 220. The holding ring 225 is pressed by the second pressure means (which will be described later) and is maintained in contact with the manual-focusing connection plate 224. The holding ring 225 is fitted on the unit support tube 211 to inhibit the rotation thereof. The reinforcement plate 226 is secured to the holding ring 225. The second disc spring 227 is a pressure spring which constitutes the second pressure means and urges the manual-focusing connection plate 224 against the first rollers 222 along the optical axis.

The second nut 228 for adjusting the pressure of the second disc spring 227 is screwed into a threaded portion formed to extend around the inner diameter portion of the unit support tube 211. The pressure of the second pressure means (the second disc spring) 227 is adjusted to a pressure larger than that of the first pressure means (the first disc spring) 215 so that slip torque due to the frictional contact between the first rollers 222 and an end surface of the manual-focusing connection plate 224 becomes as large as possible within a range smaller than slip torque due to the frictional contact between the first rollers 222 and the connection plate 220.

The operation of the lens barrel in which the focusing driving unit having the above-described structure is incorporated will be described below.

If a user operates a focusing switch (not shown) in an automatic focusing mode, a voltage is applied to the electrostrictive element 213 via a printed circuit board (not shown) by the operation of a control circuit (not shown) so that a vibration which travels along the circumference of the stator 212 is produced in the stator 212 and the rotor 218, the rubber ring 219 and the connection member 220 are rotated about the optical axis of the lens barrel by the vibration of the stator 212.

Although the first rollers 222 receive rotational toque from such rotation, the manual-focusing connection plate 224 does not rotate at this time, and the first rollers 222 roll along the end surface of the manual-focusing connection plate 224 while rotating on the respective shafts 221a of the output ring 221 and the output ring 221 also rotates about the optical axis via the shafts 221a. Thus, the cam ring 206 is driven via the projection 206b so that the first lens group tube 203 is driven to move along the optical axis to move the focusing lens group 201 along the optical axis, thereby effecting automatic focusing.

If the user desires manual focusing and rotates the focusing operating ring 209 without operating the focusing switch (not shown), the rotation of the focusing operating ring 209 is transmitted to the manual-focusing connection plate 224.

At this time, since the vibration type motor is not driven, the connection member 220 remains at rest, and the first rollers 222 roll along the end surface of the connection member 220 while rotating on the respective shafts 221a of the output ring 221, and the output ring 221 also rotates about the optical axis via the shafts 221a. Thus, the cam ring 206 is driven via the projection 206b so that the first lens group tube 203 is driven to move along the optical axis, thereby effecting manual focusing.

The manner in which a driving force is transmitted to the output ring 221 from the vibration type motor or the focusing operating ring 209 in the third embodiment will be described below with reference to FIG. 6.

Figure 6:
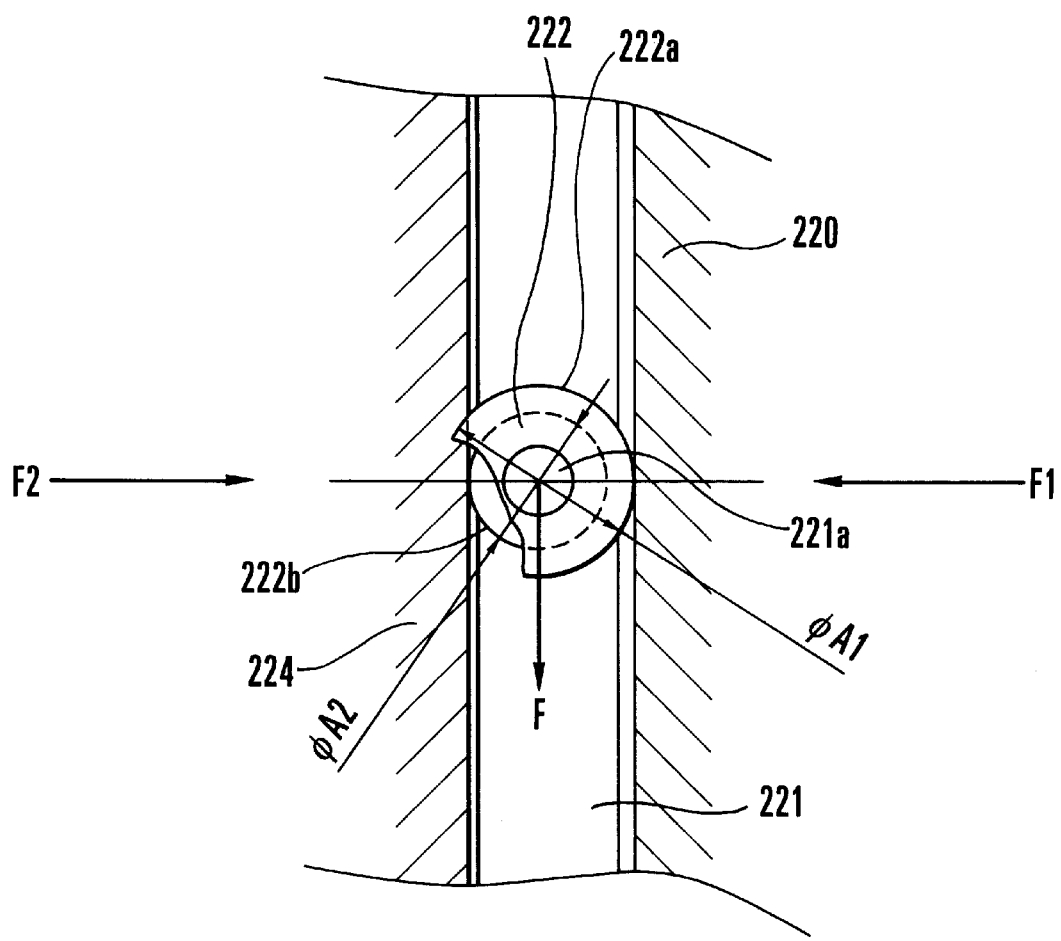
FIG. 6 is a partial developed view of the lens barrel shown in FIG. 5.

FIG. 6 is a diagrammatic developed view showing a particular one of the first rollers 222 and the vicinity thereof as viewed in the axial direction of the particular one. As can be seen from FIG. 6, if a sufficient driving force is obtained from the vibration type motor or the focusing operating ring 209, letting F be the force required to move the output ring 221, the following condition is needed for transmitting a rotation from the vibration type motor or the focusing operating ring 209 to the first roller 222 without causing a slip between the connection member 220 and the first contact portion 222a of the first roller 222:

$$\mu1 \times F1 > F \times A2/(A1+A2),$$

where F1: pressure of the first pressure means, and
  $\mu1$: friction coefficient between the connection member 220 and the first roller 222.
(In this expression, the shaft loss of the inner diameter of the first roller 222 and the shaft loss of the second roller 223 are ignored because they are small.)

Further, the following condition is needed so that no slip is caused between the manual-focusing connection plate 224 and the second contact portion 222b of the first roller 222:

$$\mu2 \times F2 > F \times A1/(A1+A2),$$

where F2: pressure of the second pressure means, and
  $\mu2$: friction coefficient between the manual-focusing connection plate 224 and the first roller 222.
(In this expression, the shaft loss of the inner diameter of the first roller 222 and the shaft loss of the second roller 223 are ignored because they are small.)

From the above two conditions, it is possible to increase the force F required to drive the output ring 221, by increasing the ratio of the outer diameter A1 of the first contact portion 222a of each of the first rollers 222 to the outer diameter A2 of the second contact portion 222b of the same and by increasing the pressure of the second pressure means, without changing the pressure of the first pressure means (which is set to an optimum pressure value capable of bringing out the performance of the vibration type motor.)

(Fourth Embodiment)

Figure 8:
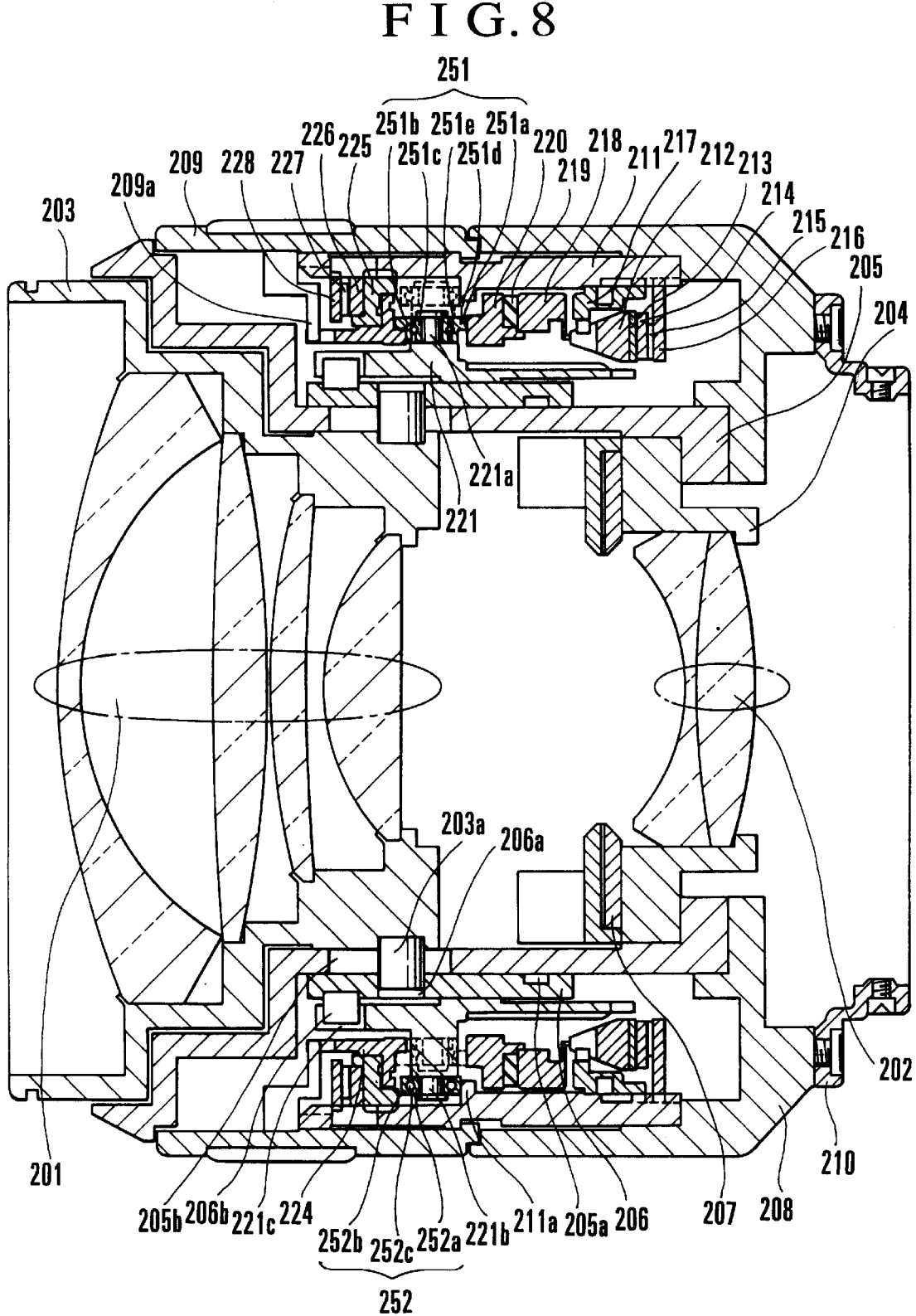
FIG. 8 is a diagrammatic cross-sectional view of a lens barrel according to a fourth embodiment of the present invention.
Figure 9:
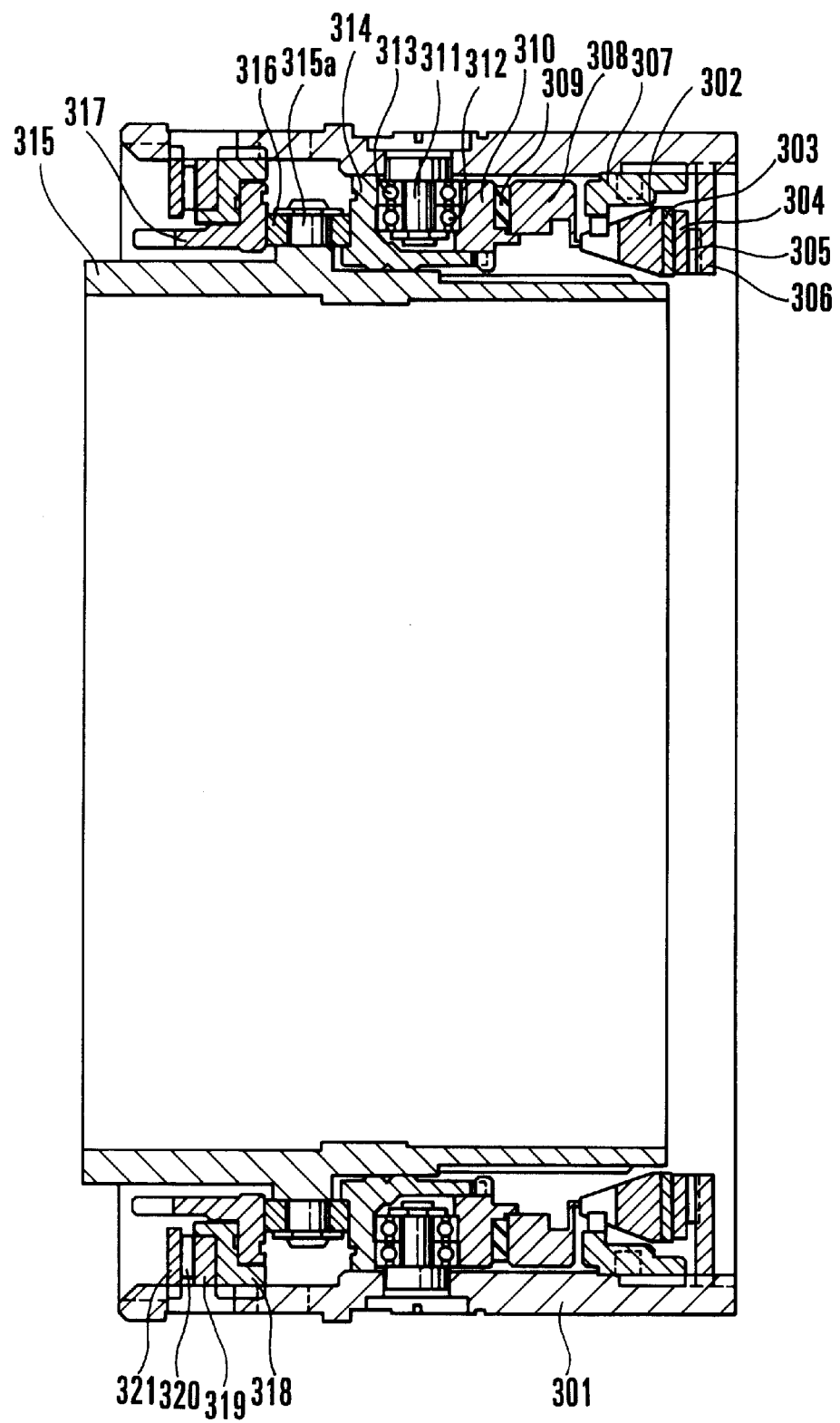
FIG. 9 is a diagrammatic cross-sectional view of a conventional lens barrel.
Figure 10:
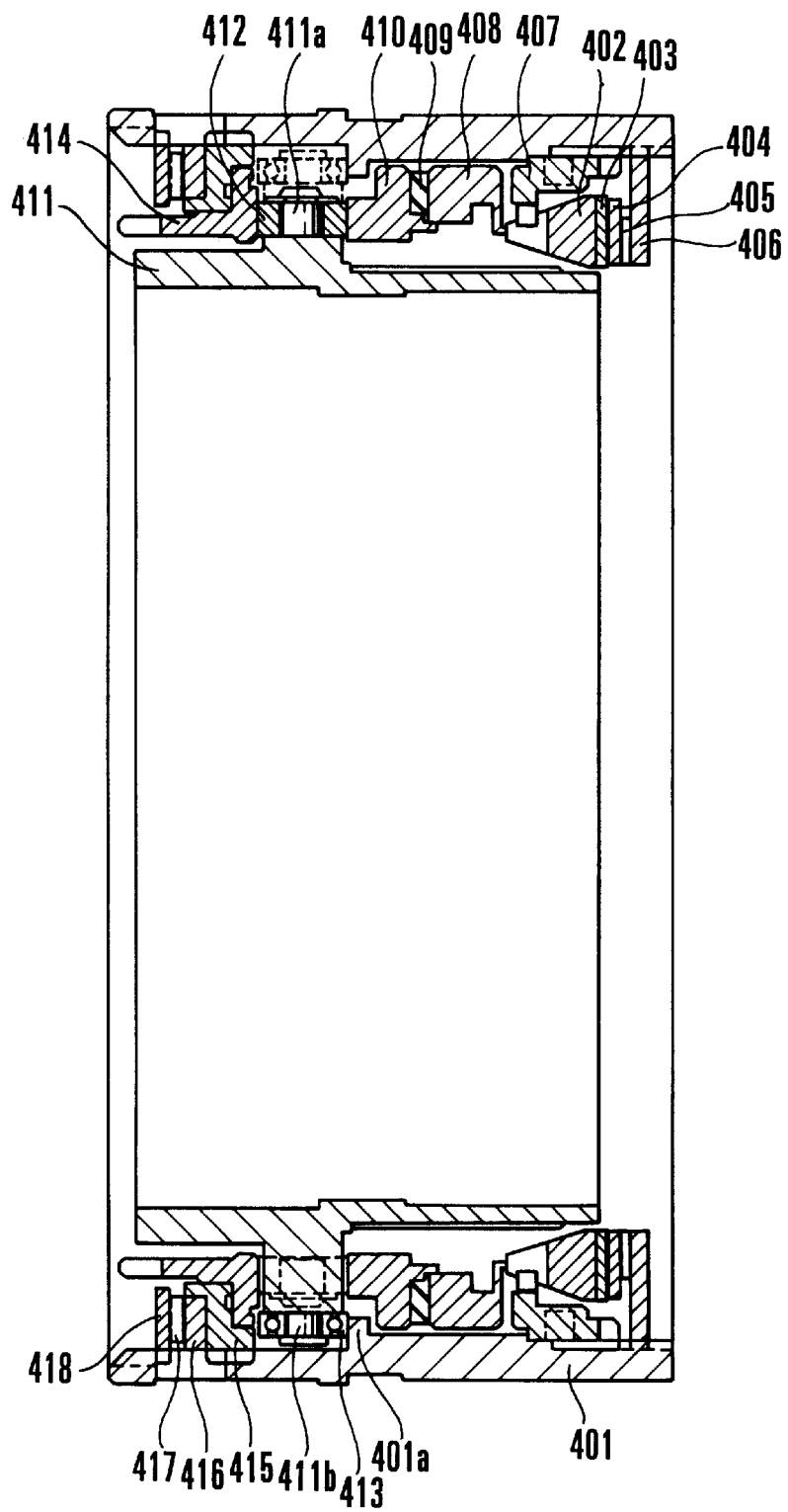
FIG. 10 is a diagrammatic cross-sectional view of lens barrel which is presupposed by the present invention.

FIG. 8 is a diagrammatic cross-sectional view of a lens barrel according to a fourth embodiment of the present invention.

In FIG. 8, reference numerals 201 to 221 and 224 to 228 denote constituent elements identical to those of the third embodiment shown in FIG. 5, and the fourth embodiment differs from the third embodiment in regard to only constituent elements 251 and 252.

The first rollers 251, which correspond to the first rollers 222 in the third embodiment, are rotatably supported by the shafts 221a disposed at a plurality of locations on the output ring 221, and revolve about the optical axis while rolling in the state of being clamped between the connection plate 220 and the manual-focusing connection plate 224 which will be described later. Each of the first rollers 251 has a first contact portion 251a which has a larger diameter (outer diameter φA1) and with which the connection member 220 is maintained in contact and a second contact portion 251b which has a smaller diameter (outer diameter φA2) and with which the manual-focusing connection plate 224 is maintained in contact.

In the fourth embodiment, each of the first rollers 251 has a structure in which two separate parts, i.e., an inner diameter side 251c and an outer diameter side 251d, are joined to each other by bearing balls 251e to eliminate the shaft loss between each of the first rollers 251 and the corresponding shaft 221a on the output ring 221.

The second rollers 252, which correspond to the second rollers 223 in the third embodiment, are rotatably supported by the shafts 221b disposed at a plurality of locations on the output ring 221, and are urged against the end surface of the inner diameter projection 211a of the unit support tube 211 by receiving the pressure applied by the second pressure means from the manual-focusing connection plate 224 (which will be described later) through the first rollers 251 and the output ring 221.

In the fourth embodiment, each of the second rollers 252 has a structure in which two separate components, i.e., an inner diameter side 252a and an outer diameter side 252b, are joined to each other by bearing balls 252c to eliminate the shaft loss between each of the second rollers 252 and the corresponding shaft 221b on the output ring 221.

Since each of the first and second rollers 251 and 252 includes two separate components joined to each other by bearing balls in the above-described manner, the shaft losses are eliminated so that the efficiency of driving torque is further enhanced.

According to each of the third and fourth embodiments, it is possible to provide an optical apparatus which has a small thrust size and can perform driving of large output torque, by increasing the driving output due to the revolution of rollers with respect to the input from the side of the vibration type motor by increasing the speed reducing ratio of the revolution of the rollers to the rotation of a rotating member on the side of the vibration type motor without changing the pressure applied from the vibration type motor, and also by increasing the slip torque due to the frictional contact between the rollers and a output member on a manual-focusing side by increasing the pressure applied from the manual-focusing side.

In addition, since the pressure of the second pressure means on the manual-focusing side is received by the rollers, losses can be made small.

In addition, since the pressure of the second pressure means on the manual-focusing side is larger than the pressure of the first pressure means on the side of the vibration type motor, a far larger output torque can be obtained.

(Fifth Embodiment)

Figure 11:
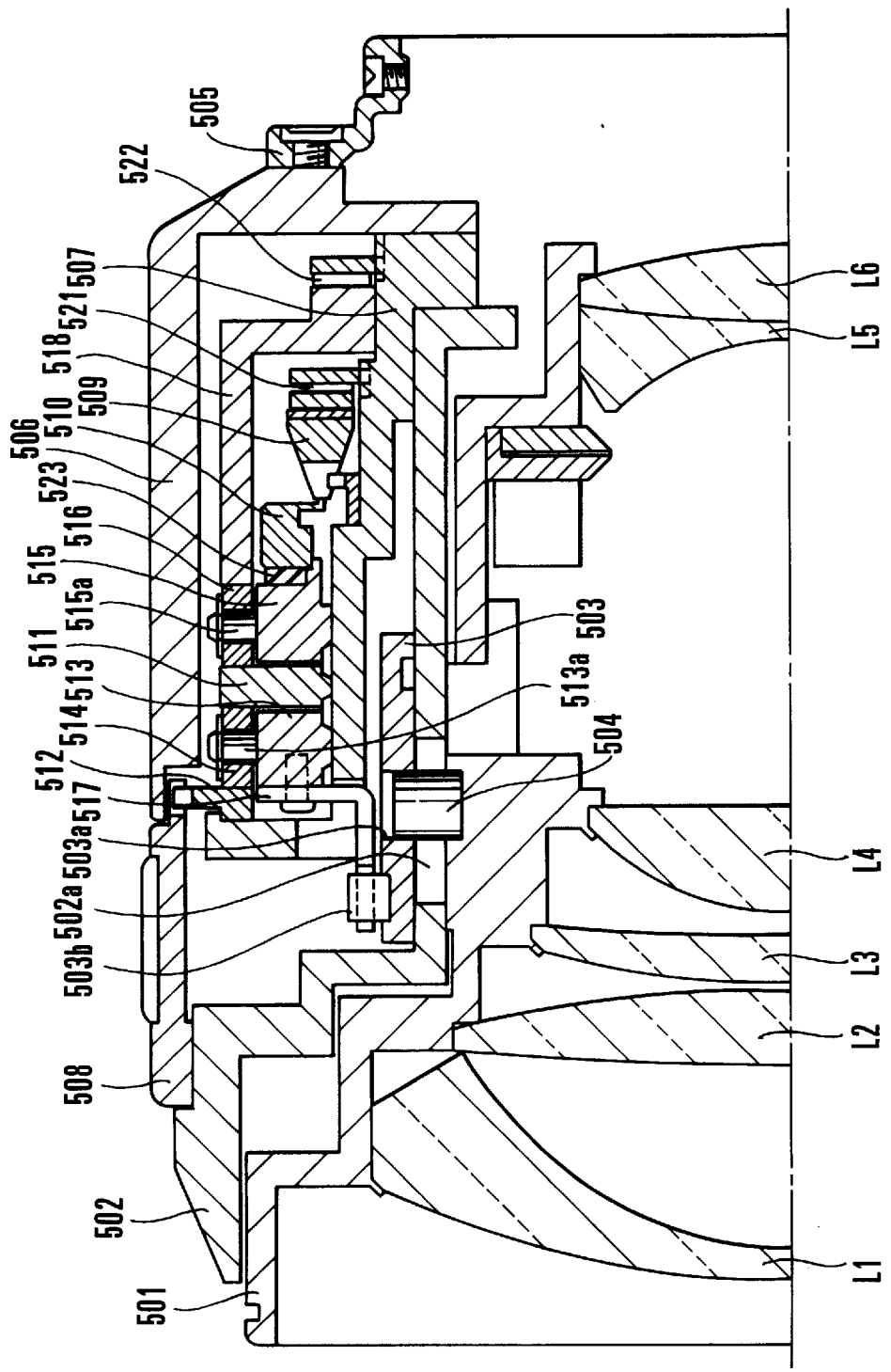
FIG. 11 is a diagrammatic cross-sectional view of a lens barrel according to a fifth embodiment of the present invention.
Figure 12:
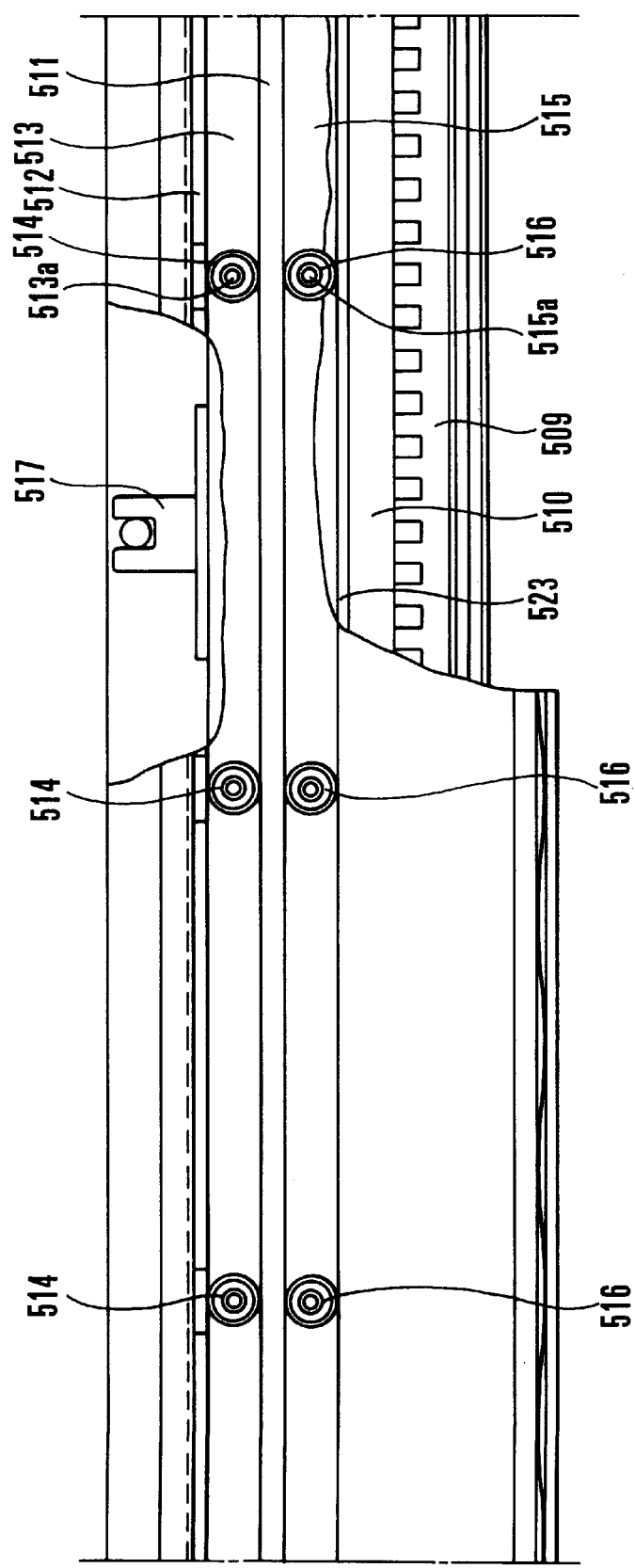
FIG. 12 is a partial developed plan view of the lens barrel according to the fifth embodiment of the present invention.

FIGS. 11 and 12 show a lens barrel according to a fifth embodiment of the present invention. Referring to FIGS. 11 and 12, lenses L1 to L6 are held by a lens frame 501. The lens frame 501 is fitted in the inner circumference of a guide tube 502 for movement along the optical axis of the lens barrel, and a cam ring 503 is rotatably fitted on the outer circumference of the guide tube 502. Rectilinear guide slots 502a which extend along the optical axis are formed in the guide tube 502, and cam slots 503a are formed in the cam ring 503. Rollers 504 fixed to the lens frame 501 are fitted in the cam slots 503a and the rectilinear guide slots 502a.

A lens mount 505 which is secured to a lens barrel body 506 has bayonet claws for connection to a camera body (not shown). A fixed tube 507 is fixed to the inside of the lens barrel body 506, and the guide tube 502 is fixed to the fixed tube 507. A manual focusing ring 508 is held for rotation about the optical axis by the guide tube 502 and the lens barrel body 506.

A stator (vibrator) 509 constitutes part of a vibration type motor, and a vibration is excited in the stator 509 by an electro-mechanical energy converting element receiving a driving signal from a driving circuit (not shown). A rotor 510 is maintained in pressure contact with the stator 509 by the pressure of a first pressure spring 521, and is rotated about the optical axis by the vibration of the stator 509. The rotor 510 is connected to a first roller support ring (power transmitting member) 515 via a rubber ring 523 so that the first roller support ring 515 is rotated about the optical axis integrally with the rotor 510. The first roller support ring 515 is held on the outer circumferential surface of the fixed tube 507 for rotation about the optical axis and for movement along the same.

Support shafts 515a which extend in radial directions centered at the optical axis are provided at a plurality of (for example, three) circumferential locations on the first roller support ring 515, and first planetary rollers 516 are rotatably secured to the respective support shafts 515a. The first planetary rollers 516 are maintained in contact with a fixed ring 518 which will be described later.

An intermediate ring 511 is held on the outer circumferential surface of the fixed tube 507 for rotation about the optical axis and for movement along the same. A second roller support ring (output member) 513 is also held on the outer circumferential surface of the fixed tube 507 for rotation about the optical axis and for movement along the same. Support shafts 513a which extend in radial directions centered at the optical axis are provided at a plurality of (for example, three) circumferential locations on the second roller support ring 513, and second planetary rollers 514 are rotatably secured to the respective support shafts 513a. The intermediate ring 511 is maintained in contact with the first planetary rollers 516 and the second planetary rollers 514.

An output arm 517 is integrally secured to the second roller support ring 513, and is engaged with an interlocking pin 503b formed on the cam ring 503, for sliding movement along the optical axis and for rotation about the optical axis integrally with the interlocking pin 503b.

A manual-focusing connection ring 512 is held on the outer circumferential surface of the fixed tube 507 for rotation about the optical axis and for movement along the same. The manual-focusing connection ring 512 is integrally rotatably engaged with the manual focusing ring 508.

The pressure of the first pressure spring 521 is received by the fixed tube 507 via the stator 509, the rotor 510, the first roller support ring 515, the first planetary rollers 516, the intermediate ring 511, the second planetary rollers 514 and the manual-focusing connection ring 512.

The fixed ring 518 is secured to the outer circumferential surface of the fixed tube 507 in such a manner that the movement of the fixed ring 518 along the optical axis is enabled but the rotation of the fixed ring 518 about the optical axis is inhibited. The fixed ring 518 is maintained in contact with the first planetary rollers 516 by the pressure of a second pressure spring 522. The pressure of the second pressure spring 522 is received by the fixed tube 507 via the fixed ring 518, the first planetary rollers 516, the intermediate ring 511, the second planetary rollers 514 and the manual-focusing connection ring 512. Accordingly, the first planetary rollers 516, the intermediate ring 511, the second planetary rollers 514 and the manual-focusing connection ring 512 are maintained in contact with one another by the pressures of both of the first pressure spring 521 and the second pressure spring 522.

The fifth embodiment is separately provided with the first pressure spring 521 for mainly producing the pressure between the stator 509 and the rotor 510 of the vibration type motor and the second pressure spring 522 for producing the pressures among the fixed ring 518, the first planetary rollers 516, the intermediate ring 511, the second planetary rollers 514 and the manual-focusing connection ring 512. Accordingly, it is possible to easily set the pressures of the respective first and second pressure springs 521 and 522 to optimum pressures, i.e., the pressure of the first pressure spring 521 can readily be set to a pressure which is capable of bringing out the maximum performance of the vibration type motor, while the pressure of the second pressure spring 522 can readily be set to a pressure which does not cause a slip between each member from the fixed ring 518 to the manual-focusing connection ring 512.

The operation of the lens barrel constructed in the above-described manner will be described below. If a user of the lens barrel operates a focusing switch (not shown) for the purpose of executing automatic focusing, a voltage is applied from a control circuit (not shown) to the electro-mechanical energy converting element so that a vibration which travels along the circumference of the stator 509 is excited in the stator 509. Then, when the stator 509 vibrates, the rotor 510 maintained in pressure contact with the stator 509 by the pressure of the first pressure spring 521 is rotationally driven, and the rubber ring 523 and the first roller support ring 515 rotate about the optical axis integrally with the rotor 510.

When the first roller support ring 515 rotates, the first planetary rollers 516 roll with respect to the fixed ring 518 (i.e., revolve about the optical axis while rotating on the respective support shafts 515a) to rotationally drive the intermediate ring 511. The rotation of the first roller support ring 515 and the rotation of the first planetary rollers 516 are combined and transmitted to the intermediate ring 511 so that the intermediate ring 511 is rotated at a speed which is twice the rotating speed of the first roller support ring 515.

Since the rotation of the manual-focusing connection ring 512 is inhibited by the friction between the manual focusing ring 508 and the guide tube 502 and others, the second planetary rollers 514 which have received rotating forces from the intermediate ring 511 roll with respect to the manual-focusing connection ring 512 (i.e., revolve about the optical axis while rotating on the respective support shafts 513a) to rotate the second roller support ring 513 at a speed which is half of the rotating speed of the intermediate ring 511. Thus, the second roller support ring 513 rotates at the same speed as the rotating speed of the vibration type motor.

The cam ring 503 connected to the second roller support ring 513 via the output arm 517 is rotationally driven by the rotation of the second roller support ring 513, and the lens frame 501 is moved along the optical axis by the action of the cam slots 503a of the cam ring 503 and the rollers 504, thereby effecting automatic focusing. Since the second roller support ring 513 and the cam ring 503 rotate at the same speed as the rotating speed of the vibration type motor as described above, it is possible to perform automatic focusing at a high speed (twofold speed) compared to a conventional lens barrel in which a cam ring and others rotate at a speed which is half of the rotating speed of the vibration type motor.

If the user manually rotates the manual focusing ring 508, the rotation of the manual focusing ring 508 is transmitted to the manual-focusing connection ring 512. At this time, since the vibration type motor is not operating, the rotation of the first roller support ring 515 is inhibited by the friction between the stator 509 and the rotor 510. Therefore, the rotation of the first planetary rollers 516 maintained in contact with the fixed ring 518 is also inhibited, and the rotation of the intermediate ring 511 maintained in contact with the first planetary rollers 516 is inhibited. Accordingly, when the manual-focusing connection ring 512 rotates, the second planetary rollers 514 roll with respect to the intermediate ring 511 (i.e., revolve about the optical axis while rotating on the respective support shafts 513a) to rotationally drive the second roller support ring 513 at a speed which is ½ times the rotating speed of the manual-focusing connection ring 512.

The cam ring 503 connected to the second roller support ring 513 via the output arm 517 is rotationally driven by the rotation of the second roller support ring 513 and the lens frame 501 is driven to move along the optical axis by the action of the cam slots 503a of the cam ring 503 and the rollers 504, thereby effecting manual focusing. Since each of the second roller support ring 513 and the cam ring 503 rotates at a speed which is half of the rotating speed of each of the manual focusing ring 508 and the manual-focusing connection ring 512 as described above, it is possible to ensure the ease of fine adjustment of focus in manual focusing, similarly to the case of the conventional lens barrel.

(Sixth Embodiment)

Figure 13:
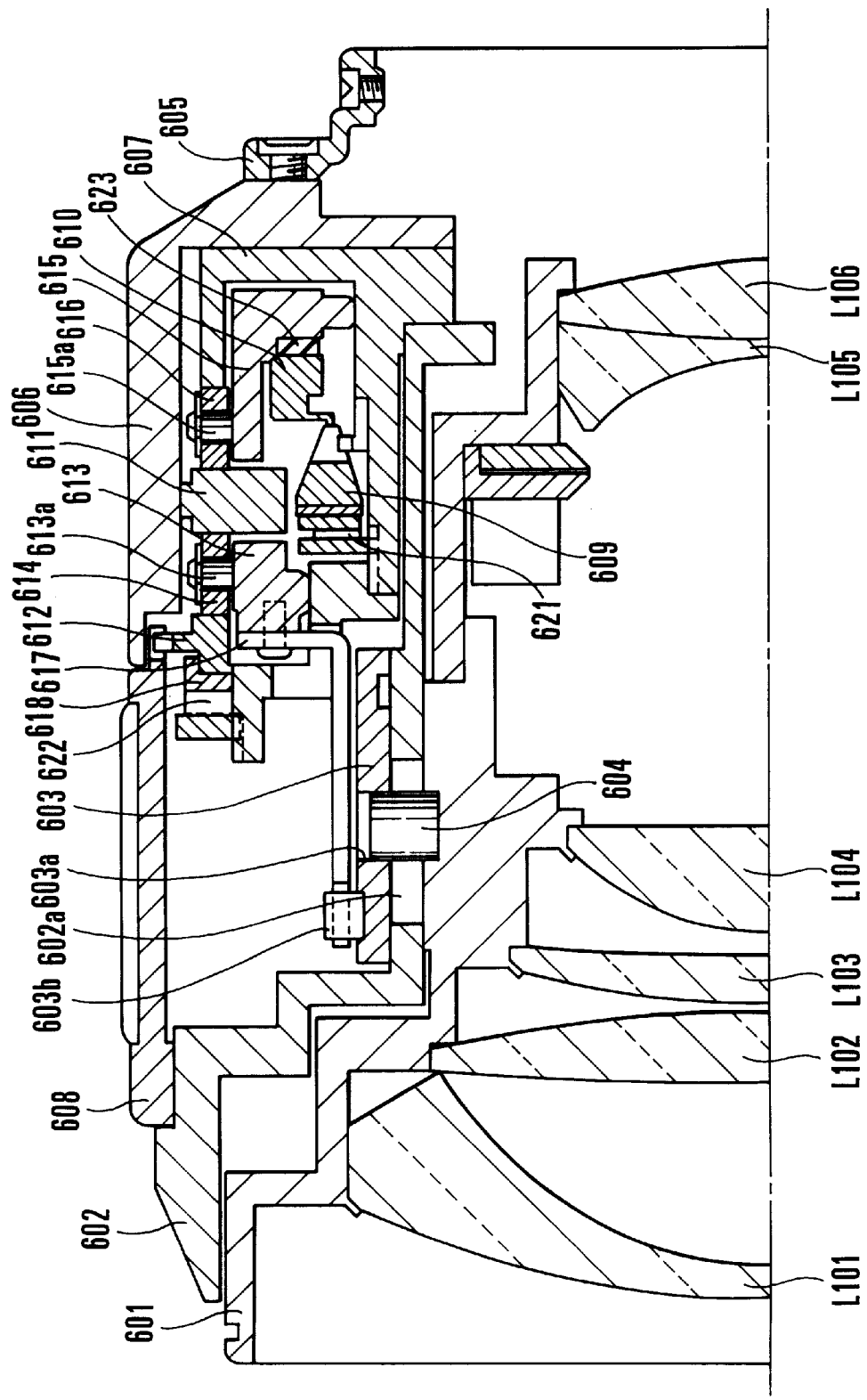
FIG. 13 is a diagrammatic cross-sectional view of a lens barrel according to a sixth embodiment of the present invention.

FIG. 13 shows a lens barrel according to a sixth embodiment of the present invention. Referring to FIG. 13, lenses L101 to L106 are held by a lens frame 601. The lens frame 601 is fitted in the inner circumference of a guide tube 602 for movement along the optical axis of the lens barrel, and a cam ring 603 is rotatably fitted on the outer circumference of the guide tube 602. Rectilinear guide slots 602a which extend along the optical axis are formed in the guide tube 602, and cam slots 603a are formed in the cam ring 603. Rollers 604 fixed to the lens frame 601 are fitted in the cam slots 603a and the rectilinear guide slots 602a.

A lens mount 605 which is secured to a lens barrel body 606 has bayonet claws for connection to a camera body (not shown). A fixed tube 607 is fixed to the inside of the lens barrel body 606, and the guide tube 602 is fixed to the fixed tube 607. A manual focusing ring 608 is held for rotation about the optical axis by the guide tube 602 and the lens barrel body 606.

A stator (vibrator) 609 constitutes part of a vibration type motor, and a vibration is excited in the stator 609 by an electro-mechanical energy converting element receiving a driving signal from a driving circuit (not shown). A rotor 610 is maintained in pressure contact with the stator 609 by the pressure of a first pressure spring 621, and is rotated about the optical axis by the vibration of the stator 609. The rotor 610 is connected to a first roller support ring (power transmitting member) 615 via a rubber ring 623 so that the first roller support ring 615 is rotated about the optical axis integrally with the rotor 610. The first roller support ring 615 is held on the outer circumferential surface of the fixed tube 607 for rotation about the optical axis and for movement along the same.

Support shafts 615a which extend in radial directions centered at the optical axis are provided at a plurality of (for example, three) circumferential locations on the first roller support ring 615, and first planetary rollers 616 are rotatably secured to the respective support shafts 615a. The first planetary rollers 616 are maintained in contact with the fixed tube (fixed member) 607.

The pressure of the first pressure spring 621 is received by the fixed tube 607 via the stator 609, the rotor 610, the first roller support ring 615 and the first planetary rollers 616.

An intermediate ring 611 is held on the inner circumferential surface of the lens barrel body 606 for rotation about the optical axis and for movement along the same. The intermediate ring 611 is maintained in contact with the first planetary rollers 616 and second planetary rollers 614 to be described later.

A second roller support ring (output member) 613 is also held on the outer circumferential surface of the fixed tube 607 for rotation about the optical axis and for movement along the same. Support shafts 613a which extend in radial directions centered at the optical axis are provided at a plurality of (in the sixth embodiment, three) circumferential locations on the second roller support ring 613, and the second planetary rollers 614 are rotatably secured to the respective support shafts 613a. An output arm 617 is integrally secured to the second roller support ring 613, and is engaged with an interlocking pin 603b formed on the cam ring 603, for sliding movement along the optical axis and for rotation about the optical axis integrally with the interlocking pin 603b.

A manual-focusing connection ring 612 is held on the outer circumferential surface of the fixed tube 607 for rotation about the optical axis and for movement along the same. The manual-focusing connection ring 612 is integrally rotatably engaged with the manual focusing ring 608 in such a manner as to be rotatable along the optical axis. The manual-focusing connection ring 612 is maintained in pressure contact with the second planetary rollers 614 by the pressure of a second pressure spring 622 provided on the outer circumferential surface of the fixed tube 607.

The pressure of the second pressure spring 622 is received by the fixed tube 607 via the manual-focusing connection ring 612, the second planetary rollers 614, the intermediate ring 611 and the first planetary rollers 616. The first planetary rollers 616 and the fixed tube 607 are maintained in pressure contact with each other by the pressures of both of the first pressure spring 621 and the second pressure spring 622.

The sixth embodiment is separately provided with the first pressure spring 621 for mainly producing the pressure between the stator 609 and the rotor 610 of the vibration type motor and the second pressure spring 622 for producing the pressures among the manual-focusing connection ring 612, the second planetary rollers 614, the intermediate ring 611, the first planetary rollers 616 and the fixed tube 607. Accordingly, it is possible to easily set the pressures of the respective first and second pressure springs 621 and 622 to optimum pressures, i.e., the pressure of the first pressure spring 621 can readily be set to a pressure which is capable of bringing out the maximum performance of the vibration type motor, while the pressure of the second pressure spring 622 can readily be set to a pressure which does not cause a slip between each member from the manual-focusing connection ring 612 to the fixed tube 607.

The operation of the lens barrel constructed in the above-described manner will be described below. If a user of the lens barrel operates a focusing switch (not shown) for the purpose of executing automatic focusing, a voltage is applied from a control circuit (not shown) to the electromechanical energy converting element so that a vibration which travels along the circumference of the stator 609 is excited in the stator 609. Then, when the stator 609 vibrates, the rotor 610 maintained in pressure contact with the stator 609 by the pressure of the first pressure spring 621 is rotationally driven, and the rubber ring 623 and the first roller support ring 615 rotate about the optical axis integrally with the rotor 610.

When the first roller support ring 615 rotates, the first planetary rollers 616 roll with respect to the fixed ring 607 (i.e., revolve about the optical axis while rotating on the respective support shafts 615a) to rotationally drive the intermediate ring 611. The rotation of the first roller support ring 615 and the rotation of the first planetary rollers 616 are combined and transmitted to the intermediate ring 611 so that the intermediate ring 611 is rotated at a speed which is twice the rotating speed of the first roller support ring 615.

Since the rotation of the manual-focusing connection ring 612 is inhibited by the friction between the manual focusing ring 608 and the guide tube 602 and others, the second planetary rollers 614 which have received rotating forces from the intermediate ring 611 roll with respect to the manual-focusing connection ring 612 (i.e., revolve about the optical axis while rotating on the respective support shafts 613a) to rotate the second roller support ring 613 at a speed which is half of the rotating speed of the intermediate ring 611. Thus, the second roller support ring 613 rotates at the same speed as the rotating speed of the vibration type motor.

The cam ring 603 connected to the second roller support ring 613 via the output arm 617 is rotationally driven by the rotation of the second roller support ring 613, and the lens frame 601 is moved along the optical axis by the action of the cam slots 603a of the cam ring 603 and the rollers 604, thereby effecting automatic focusing. Since the second roller support ring 613 and the cam ring 603 rotate at the same speed as the rotating speed of the vibration type motor as described above, it is possible to perform automatic focusing at a high speed (twofold speed) compared to a conventional lens barrel in which a cam ring and others rotate at a speed which is half of the rotating speed of the vibration type motor.

If the user manually rotates the manual focusing ring 608, the rotation of the manual focusing ring 608 is transmitted to the manual-focusing connection ring 612. At this time, since the vibration type motor is not operating, the rotation of the first roller support ring 615 is inhibited by the friction between the stator 609 and the rotor 610. Therefore, the rotation of the first planetary rollers 616 maintained in contact with the fixed tube 607 is also inhibited, and the rotation of the intermediate ring 611 maintained in contact with the first planetary rollers 616 is inhibited. Accordingly, when the manual-focusing connection ring 612 rotates, the second planetary rollers 614 roll with respect to the intermediate ring 611 (i.e., revolve about the optical axis while rotating on the respective support shafts 613a) to rotationally drive the second roller support ring 613 at a speed which is ½ times the rotating speed of the manual-focusing connection ring 612.

The cam ring 603 connected to the second roller support ring 613 via the output arm 617 is rotationally driven by the rotation of the second roller support ring 613 and the lens frame 601 is moved along the optical axis by the action of the cam slots 603a of the cam ring 603 and the rollers 604, thereby effecting manual focusing. Since each of the second roller support ring 613 and the cam ring 603 rotates at a speed which is half of the rotating speed of each of the manual focusing ring 608 and the manual-focusing connection ring 612 as described above, it is possible to ensure the ease of fine adjustment of focus in manual focusing, similarly to the case of the conventional lens barrel.

(Seventh Embodiment)

Figure 14:
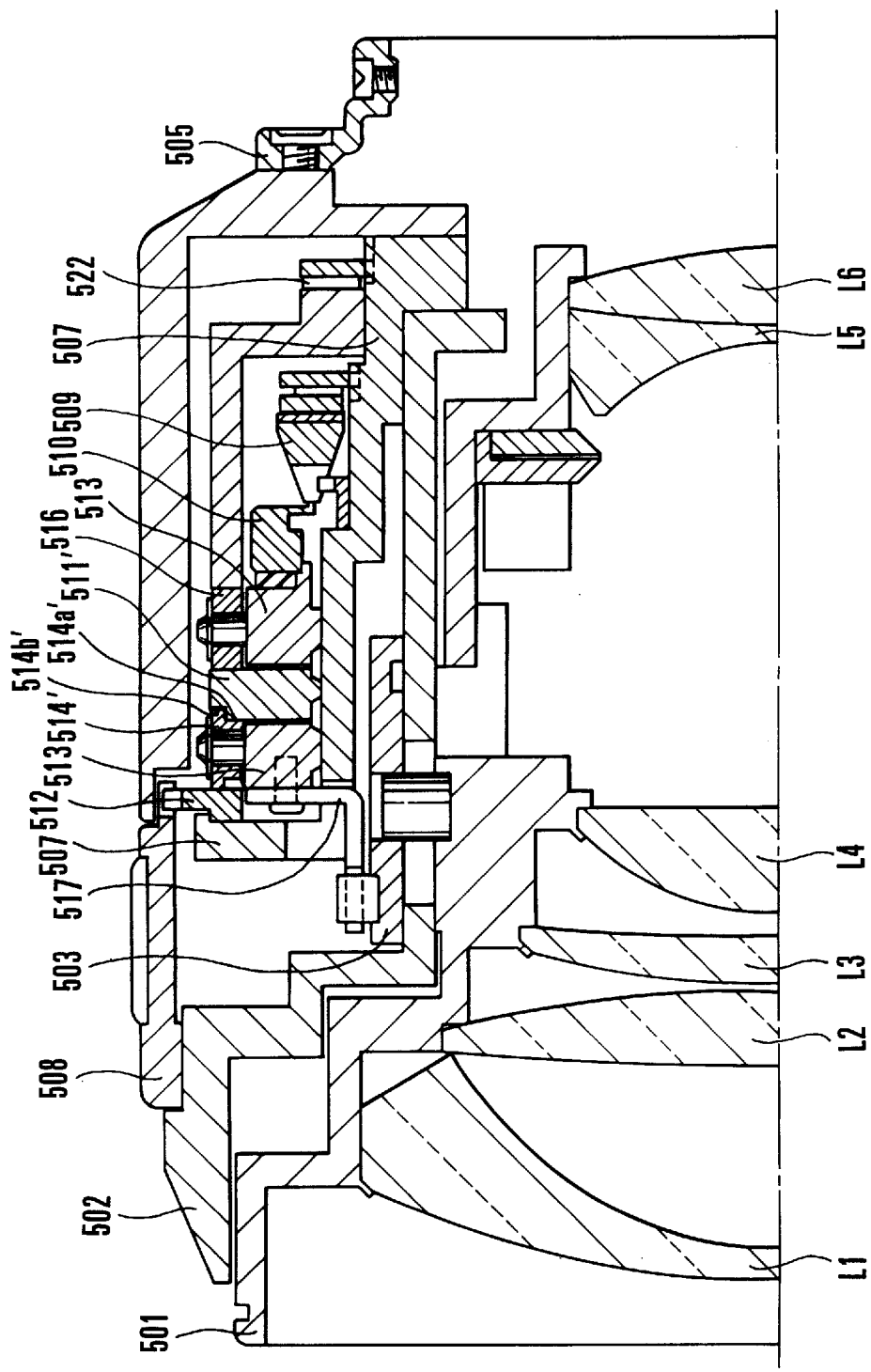
FIG. 14 is a diagrammatic cross-sectional view of a lens barrel according to a seventh embodiment of the present invention.

Each of the fifth and sixth embodiments has been described above with reference to an arrangement which uses planetary rollers each having a uniform outer diameter. However, as shown in FIG. 14, each second planetary roller 514' may have a small-diameter portion 514a' and a large-diameter portion 514b' having a larger outer diameter than the small-diameter portion 514a' in such a manner that the small-diameter portion 514a, and the large-diameter portion 514b' are brought into contact with an intermediate ring 511' and a manual-focusing connection ring 512, respectively. Incidentally, the seventh embodiment shown in FIG. 14 is a modification of the fifth embodiment shown in FIG. 11, and constituent elements common to both the fifth and seventh embodiments are indicated by identical reference numerals.

During automatic focusing, the large-diameter portion 514b' of each of the second planetary rollers 514' rolls on the manual-focusing connection ring 512 to rotate the second roller support ring 513 and the cam ring 503.

Letting d be the outer diameter of the small-diameter portion 514a' and D the outer diameter of the large-diameter portion 514b', the second roller support ring 513 rotates at a speed which is D/(D+d) times the rotating speed of the intermediate ring 511'. Accordingly, the second roller support ring 513 rotates at a speed which is 2D/(D+d) times the rotating speed of each of the rotor 510 and the first roller support ring 515, whereby automatic focusing can be effected at a higher speed than in the fifth embodiment.

During manual focusing, the small-diameter portion 514a' of the second planetary rollers 514' rolls on the intermediate ring 511' to rotate the second roller support ring 513 and the cam ring 503. In this case, the second roller support ring 513 rotates at a speed which is d/(D+d) times the rotating speed of the manual-focusing connection ring 512, i.e., the second roller support ring 513 rotates at a speed which is slower than ½ times the rotating speed of the manual focusing ring 508. Accordingly, it is possible to effect manual focusing which enables far easier fine adjustment of focus (better operability) than the case of the fifth embodiment.

Although any of the fifth, sixth and seventh embodiments has been described above with reference to the arrangement in which the manual-focusing connection ring 512 (or 612) is directly connected to the focusing operating ring 508 (or 608), a speed reducing or increasing mechanism may also be interposed between the manual-focusing connection ring 512 or 612 and the focusing operating ring 508 or 608.

Although any of the fifth to seventh embodiments has been applied to a lens barrel, the present invention can be applied to any optical apparatus other than such lens barrel as well as to any other apparatus that has an arrangement and construction capable of selectively driving an output member by a powered operating force and a manual operating force.

As described above, according to each of the fifth to seventh embodiments, not only is it possible to retain the advantage of the conventional driving device which can rotationally drive the output member selectively by the driving force of a driving source and the driving force of a manual operation without the need for a special changeover operation, but also the rotation of an operating force transmitting member can be transmitted to an output member as a rotation of reduced speed via second planetary rotating members, whereas the rotation of a power transmitting member is temporarily speed-increased between first planetary rotating members and an intermediate member, and after the rotation is restored to the original speed between the intermediate member and the second planetary rotating members, the rotation can be transmitted to the output member (as a rotation of rotating speed equal to the rotating speed of the power transmitting member). Accordingly, if this driving device is used to drive a lens for focusing purpose, it is possible to realize an optical apparatus which allows fine adjustment of focus to be readily performed by a manual operation and which can perform automatic focusing at high speeds.

Incidentally, if each of the second planetary rotating members is provided with a first outer diameter portion and a second outer diameter portion which differs in diameter from the first outer diameter portion, it is possible to freely set a speed reducing rate in the transmission of rotation from the operating force transmitting member to the output member and a speed increasing rate in the transmission of rotation from the power transmitting member to the output member.

Particularly in a case where the driving source is a vibration type motor, if pressure means for maintaining the first and second planetary rotating members in pressure contact with the fixed member, the intermediate member and the operating force transmitting member is provided separately from pressure means for maintaining the vibrator and the contact element in pressure contact with each other, it is possible to readily optimally set the pressure between each member inside and outside the vibration type motor.

We claim:

1. A driving device for an optical member, comprising:
   a first transmitting member for transmitting a driving force provided by a driving source;
   a second transmitting member for transmitting a driving force provided by a manual operation;
   an output member to which the driving forces from said first and second transmitting members are transmitted, the optical member being moved by a rotation of said output member; and
   a planetary rotating member in contact with said second transmitting member and said output member,
   wherein said planetary rotating member is supported for rotation with respect to said first transmitting member, and said first transmitting member rotates while revolving said planetary rotating member.

2. A device according to claim 1, wherein said planetary rotating member is provided with a first outer diameter portion and a second outer diameter portion which differ from each other in outer diameter, said second transmitting member and said first outer diameter portion being in contact with each other, and said output member being in contact with said second outer diameter portion.

3. A device according to claim 2, wherein said first outer diameter portion is larger in outer diameter than said second outer diameter portion.

4. A device according to claim 1, wherein said driving source is a vibration type motor which relatively drives a vibrator in which a vibration is to be excited and a contact element which is in contact with said vibrator.

5. A device according to claim 4, wherein said vibrator and said contact element are maintained in pressure contact with each other by a first pressure member, while said second transmitting member and said planetary rotating member are maintained in pressure contact with each other by a second pressure member.

6. A device according to claim 1, wherein said optical member is a lens, said lens being moved along an optical axis by the rotation of said output member.

7. A driving device for an optical member, comprising:
a first transmitting member for transmitting a driving force provided by a driving source;
a second transmitting member for transmitting a driving force provided by a manual operation;
a planetary rotating member in contact with said first and second transmitting members;
an output member which rotatably supports said planetary rotating member and is capable of rotating while revolving said planetary rotating member about an optical axis, the optical member being moved by a rotation of said output member;
a first pressure mechanism for maintaining said first transmitting member and said planetary rotating member in pressure contact with each other; and
a second pressure mechanism for maintaining said second transmitting member and said planetary rotating member in pressure contact with each other,
wherein said planetary rotating member is provided with a first outer diameter portion which is in contact with said first transmitting member and a second outer diameter portion which is in contact with said second transmitting member and has an outer diameter smaller than said first outer diameter portion, a second pressure provided by said second pressure mechanism being set to be larger than a first pressure provided by said first pressure mechanism.

8. A device according to claim 7, wherein said driving source is a vibration type motor having a vibrator and a contact element, said first pressure mechanism being used to maintain said vibrator and said contact element in pressure contact with each other.

9. A device according to claim 7, further comprising a roller member which is supported on said output member for rotation about a radial axis and is in contact with a receiving member in such a manner as to receive said second pressure provided by said second pressure mechanism.

10. A device according to claim 8, further comprising a roller member which is disposed on said output member for rotation about a radial axis and is in contact with a receiving member in such a manner as to receive said second pressure provided by said second pressure mechanism.

11. A driving device for an optical member, comprising:
a first transmitting member for transmitting a driving force provided by a driving source;
a second transmitting member for transmitting a driving force provided by a manual operation;
an output member to which the driving forces from said first and second transmitting members are transmitted, the optical member being moved by a rotation of said output member;
a first planetary rotating member which is supported for rotation with respect to said first transmitting member;
an intermediate member to which a rotation of said first transmitting member is transmitted as a rotation having a rotating speed increased by a rolling rotation and a revolution of said first planetary rotating member; and
a second planetary rotating member in contact with said second transmitting member and said intermediate member, said second planetary rotating member being supported for rotation with respect to said output member,
wherein said output member is rotated by a rolling rotation and a revolution of said second planetary rotating member caused by a rotation of said intermediate member or a rotation of said second transmitting member.

12. A device according to claim 11, wherein said driving source is a vibration type motor having a vibrator and a contact element.

13. A device according to claim 11, wherein said second planetary rotating member is provided with a first outer diameter portion which is in contact with said intermediate member and a second outer diameter portion which is in contact with said second transmitting member and has an outer diameter larger than said first outer diameter portion.

14. A device according to claim 12, wherein said vibrator and said contact element are maintained in pressure contact with each other by a first pressure mechanism, and said intermediate member and said second transmitting member are maintained in pressure contact with each other by a second pressure mechanism.

15. A device according to claim 14, wherein said first planetary rotating member is maintained in pressure contact with a fixed member by a pressure of said second pressure mechanism, and is rolled and revolved by a rotation of said first transmitting member.

16. A device according to claim 14, wherein said first planetary rotating member and said intermediate member, said intermediate member and said second planetary rotating member, and said second planetary rotating member and said second transmitting member are maintained in pressure contact with each other by a pressure of said second pressure mechanism.

17. A driving device for an optical member, comprising:
a first transmitting member for transmitting a driving force provided by a driving source;
a second transmitting member for transmitting a driving force provided by a manual operation;
an output member to which the driving forces from said first and second transmitting members are transmitted, the optical member being moved by a rotation of said output member; and
a planetary rotating member which is provided in a first transmitting path from said first transmitting member to said output member, said planetary rotating member being also used as a second transmitting path from said second transmitting member to said output member,
wherein said planetary rotating member has large-diameter portions and a small-diameter portion formed therebetween in such a manner that said planetary rotating member has contact portions which differ in outer diameter between said first transmitting path and said second transmitting path.

18. A device according to claim 17, wherein said driving source is a vibration type motor having a vibrator and a contact element.

19. An optical apparatus comprising:
a first transmitting member for transmitting a driving force provided by a driving source;
a second transmitting member for transmitting a driving force provided by a manual operation;
an output member to which the driving forces from said first and second transmitting members are transmitted, an optical member being moved by a rotation of said output member; and
a planetary rotating member in contact with said second transmitting member and said output member,
wherein said planetary rotating member is supported for rotation with respect to said first transmitting member, and said first transmitting member rotates while revolving said planetary rotating member.

20. An optical apparatus comprising:
a first transmitting member for transmitting a driving force provided by a driving source;
a second transmitting member for transmitting a driving force provided by a manual operation;
a planetary rotating member in contact with said first and second transmitting members;
an output member which rotatably supports said planetary rotating member and is capable of rotating while revolving said planetary rotating member about an optical axis, an optical member being moved by a rotation of said output member;
a first pressure mechanism for maintaining said first transmitting member and said planetary rotating member in pressure contact with each other; and
a second pressure mechanism for maintaining said second transmitting member and said planetary rotating member in pressure contact with each other,
wherein said planetary rotating member is provided with a first outer diameter portion which is in contact with said first transmitting member and a second outer diameter portion which is in contact with said second transmitting member and has an outer diameter smaller than said first outer diameter portion, a second pressure provided by said second pressure mechanism being set to be larger than a first pressure provided by said first pressure mechanism.

21. An optical apparatus comprising:
a first transmitting member for transmitting a driving force provided by a driving source;
a second transmitting member for transmitting a driving force provided by a manual operation;
an output member to which the driving forces from said first and second transmitting members are transmitted, an optical member being moved by a rotation of said output member;
a first planetary rotating member which is supported for rotation with respect to said first transmitting member;
an intermediate member to which a rotation of said first transmitting member is transmitted as a rotation having a rotating speed increased by a rolling rotation and a revolution of said first planetary rotating member; and
a second planetary rotating member in contact with said second transmitting member and said intermediate member, said second planetary rotating member being supported for rotation with respect to said output member,
wherein said output member is rotated by a rolling rotation and a revolution of said second planetary rotating member caused by a rotation of said intermediate member or a rotation of said second transmitting member.

22. An optical apparatus comprising:
a first transmitting member for transmitting a driving force provided by a driving source;
a second transmitting member for transmitting a driving force provided by a manual operation;
an output member to which the driving forces from said first and second transmitting members are transmitted, an optical member being moved by a rotation of said output member; and
a planetary rotating member which is provided in a first transmitting path from said first transmitting member to said output member, said planetary rotating member being also used as a second transmitting path from said second transmitting member to said output member,
wherein said planetary rotating member has large-diameter portions and a small-diameter portion formed therebetween in such a manner that said planetary rotating member has contact portions which differ in outer diameter between said first transmitting path and said second transmitting path.

23. A driving device for an optical member, comprising:
a first transmitting member for transmitting a driving force provided by a driving source, said first transmitting member being rotatable;
a second transmitting member for transmitting a driving force provided by a manual operation, said second transmitting member being rotatable;
a rolling member which is supported substantially rotatably with respect to said first transmitting member at a position in a direction radial to the rotation of said first transmitting member;
a driving mechanism which is driven by the rotation of said rolling member to move said optical member, wherein said second transmitting member is in contact with said rolling member and said rolling member is rotated by the rotation of said first transmitting member and the rotation of said second transmitting member.

24. A driving device according to claim 23, wherein said rolling member is supported substantially rotatably relative to a shaft extending radially from said first transmitting member, said shaft rotates together with the rotation of said first transmitting member and said rolling member rotates with said second transmitting member being fixed, while said rolling member is rotates by the rotation of said second transmitting member with the first transmitting member being fixed.

25. A driving device according to claim 23, wherein said driving source is a vibration type motor which relatively drives a vibrator in which a vibration is to be excited and a contact element which is in contact with said vibrator.

26. A driving device according to claim 24, wherein said driving source is a vibration type motor which relatively drives a vibrator in which a vibration is to be excited and a contact element which is in contact with said vibrator.

27. A driving device according to claim 25, wherein said vibrator and contact element are maintained in pressure contact with each other by a first pressure member, while said second transmitting member and said rolling member are maintained in pressure contact with each other by a second pressure member.

28. A driving device according to claim 24, wherein said roller member is provided with a first outer diameter portion and a second outer diameter portion which differ from each other in outer diameter, said second transmitting member and said first outer diameter portion being in contact with each other, and an output member of said driving mechanism being in contact with said second outer diameter portion.

29. A driving device according to claim 28, wherein said first outer-diameter portion is located outer diameter than said second outer diameter portion.

30. An optical apparatus comprising:
a first transmitting member for transmitting a drive force provided by a driving source, said first transmitting member being rotatable about an optical axis;
a second transmitting member for transmitting a driving force provided by a manual operation, said second transmitting member being rotatable;
a rolling member which is supported substantially rotatably relative to the rotation of said first transmitting member at a position in a direction radial to the rotation of the first transmitting member; and a driving mechanism which is driven by the rotation of said rolling member to rotate an optical member in an optical axis direction, wherein said second transmitting member is in contact with said rolling member and said rolling member is rotated by the rotation of said first transmitting member and the rotation of said second transmitting member.

31. An optical apparatus according to claim 30, wherein said rolling member is supported rotatably relative to a shaft extending in a direction vertical to the optical axis of said first transmitting member, said shaft rotates together with the rotation of said first transmitting member, and said rolling member rotates with said second transmitting member being fixed, while said rolling member is rotated by the rotation of said second transmitting member with said first transmitting member being fixed.

32. An apparatus according to claim 30, wherein said driving source is a vibration type motor which relatively drives a vibrator in which a vibration is to be exited and a contact element which is in contact with said vibrator.

33. An apparatus according to claim 31, wherein said driving source is a vibration type motor which relatively drives a vibrator in which a vibration is to be exited and a contact element which is in contact with said vibrator.

34. An apparatus according to claim 32, wherein said vibrator and contact element are maintained in pressure contact with each other by a first pressure member, while said second transmitting member and said rolling member are maintained in pressure contact with each other by a second pressure member.

35. An apparatus according to claim 31, wherein said roller member is provided with a first outer diameter portion and a second outer diameter portion which differ from each other in outer diameter, said second transmitting member and said first outer diameter portion being in contact with each other, and an output member of said driving mechanism being in contact with said second outer diameter portion.

36. An apparatus according to claim 35, wherein said first outer diameter portion is larger in outer diameter than said second outer diameter portion.

37. An optical apparatus according to claim 30, wherein said rolling member is disposed in the number not less than three on an outer periphery of said first transmitting member.

38. An optical apparatus according to claim 30, wherein said second transmitting member rotates about the optical axis.

39. An apparatus according to claim 30, wherein said optical element is a lens for focusing.

* * * * *